US012197200B2

(12) United States Patent
Satoh et al.

(10) Patent No.: US 12,197,200 B2
(45) Date of Patent: Jan. 14, 2025

(54) ANOMALY DETECTION APPARATUS, ANOMALY DETECTION METHOD, AND RECORDING MEDIUM

(71) Applicant: NEC Corporation, Tokyo (JP)

(72) Inventors: Mineto Satoh, Tokyo (JP); Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 365 days.

(21) Appl. No.: 17/760,512

(22) PCT Filed: Sep. 30, 2019

(86) PCT No.: PCT/JP2019/038642
§ 371 (c)(1),
(2) Date: Mar. 15, 2022

(87) PCT Pub. No.: WO2021/064833
PCT Pub. Date: Apr. 8, 2021

(65) Prior Publication Data
US 2022/0357730 A1    Nov. 10, 2022

(51) Int. Cl.
*G05B 23/00*    (2006.01)
*G05B 23/02*    (2006.01)

(52) U.S. Cl.
CPC ................................. *G05B 23/024* (2013.01)

(58) Field of Classification Search
None
See application file for complete search history.

(56) References Cited

U.S. PATENT DOCUMENTS

2016/0352766 A1*  12/2016  Flacher ................... H04L 12/28
2018/0196014 A1*   7/2018  Mann, III ............ G05B 23/024
2019/0236463 A1    8/2019  Nakata et al.

FOREIGN PATENT DOCUMENTS

| JP | 2007-272436 A | 10/2007 |
| JP | 2017-151121 A | 8/2017 |
| JP | 2018-163530 A | 10/2018 |
| JP | 2019-117556 A | 7/2019 |
| JP | 2019-133626 A | 8/2019 |

OTHER PUBLICATIONS

English translation of Written opinion for PCT Application No. PCT/JP2019/038642, mailed on Dec. 3, 2019.
International Search Report for PCT Application No. PCT/JP2019/038642, mailed on Dec. 3, 2019.

* cited by examiner

*Primary Examiner* — Paul B Yanchus, III

(57) ABSTRACT

Provided is an anomaly detection apparatus 10 capable of detecting anomalies of processing results. The anomaly detection apparatus 10 estimates first processing result information in accordance with first processing, using data regarding a target, compares second processing result data, for the data, obtained by second processing that differs from the first processing with the first processing result information, and detects an anomaly of the second processing according to the comparison result.

10 Claims, 14 Drawing Sheets

ANOMALY DETECTION APPARATUS, ANOMALY DETECTION METHOD, AND RECORDING MEDIUM

This application is a National Stage Entry of PCT/JP2019/038642 filed on Sep. 30, 2019, the contents of all of which are incorporated herein by reference, in their entirety.

TECHNICAL FIELD

The invention technical field relates to an anomaly detection apparatus and the like for detecting anomalies of processing results.

BACKGROUND ART

Technologies relating to artificial intelligences (AIs) are currently applied to various applications following improvements in hardware performance and development of algorithms such as deep learning. Introducing AIs is expected to dramatically improve the processing accuracy of recognition, control and the like. Thus, AIs are applied in fields such as speech recognition, image recognition, autonomous driving control and robot control, for example.

However, in the case where complex processing that requires human judgment (e.g., processing that affects social infrastructure, etc.) is replaced with an AI, desired processing results or appropriate processing results that satisfy certain requirements are demanded of the processing results of the AI (subsequently referred to as "AI processing results"). That is, a high level of processing accuracy is demanded of AIs.

In order to guarantee a high level of processing accuracy (e.g., to guarantee safety) for AIs, a human needs to confirm the AI processing results and processing for determining the validity of the AI processing results is required.

Conceivable situations in which the processing accuracy of AIs deteriorates include (1) the case where AIs are used in an environment where it is difficult to eliminate various uncertainties in the physical world (real world), and (2) the case where AIs are used in an environment in which there are unexperienced events that have never been experienced or learned. Here, physical world (real world) is used to distinguish from a cyber world (e.g., being under simulation).

Specific examples of (1) will be described. Sensors that are used in order to recognize the physical world may not necessarily be able to accurately observe and recognize all states, due to limitations in their observation capabilities and the diversity of the observation target (e.g., due to dynamic variation, being concealed by other objects, changes in ambient light, etc.). Also, practical processing results may not be obtained with control devices (e.g., actuators, etc.) that act on the physical world, due to limitations in output accuracy with respect to control inputs and the diversity of the real environment (e.g., due to the influence of resistance, friction, weight, etc.).

Specific examples of (2) will be described. Since AIs execute processing based on models (e.g., neural networks, etc.) generated in advance by machine learning or the like, AIs are robust and have high processing accuracy with respect to learned (or experienced) inputs, but may be weak and have low processing accuracy with respect to unlearned (or unexperienced) inputs.

For example, in the case where an unexperienced image is input to an AI that classifies input images, the AI may not be able to output the correct processing result, due to being unable to accurately classify the image, or the AI may be output an incorrect processing result in which the image is classified within the learned range.

In view of this, methods for strengthening learning have been proposed as methods of addressing (1) and (2). For example, in Generative Adversarial Networks (GANs), the data amount and variations of data are increased by generating diverse data. In transfer learning, for example, in the case where the training data and the prediction data are heterogenous data, the training data is modified such that the heterogeneity between the training data and the prediction data decreases, a model is created based on the modified training data, and the created model is applied to the prediction data. Due to such processing, transfer learning realizes a high prediction accuracy.

Patent Document 1 discloses a method of preventing processing results from being in an anomalous state (false identification, false determination), in an AI that identifies the type of objects and specifies the position of the objects.

Patent Document 2 discloses a method of preventing processing results from being anomalous (in this case, tracking failure), in an AI that tracks objects.

LIST OF RELATED ART DOCUMENTS

Patent Document

Patent Document 1: Japanese Patent Laid-Open Publication No. 2018-163530
Patent Document 2: Japanese Patent Laid-Open Publication No. 2007-272436

SUMMARY OF INVENTION

Technical Problems

However, it is not possible to encompass the real physical world, even using the above-described methods for strengthening learning or the technologies disclosed in Patent Documents 1 and 2.

That is, in (1) an environment where it is difficult to eliminate various uncertainties in the physical world, and (2) an environment in which there are unexperienced events that the AI has never experienced or learned (or an environment where there is heterogeneity between training data and prediction data), the prediction accuracy of the AI may deteriorate, and correct processing results may not be obtained.

An example object of the invention is to provide an anomaly detection apparatus and the like capable of detecting an anomaly of a processing result.

Solution to the Problems

An anomaly detection apparatus according to an example aspect of the invention includes:

an estimation unit that estimates first processing result information in accordance with first processing, using data regarding a target;

an evaluation unit that compares second processing result data, for the data, obtained by second processing that differs from the first processing with the first processing result information; and a detection unit that detects an anomaly of the second processing according to a result of the comparison.

An anomaly detection method according to an example aspect of the invention includes:

estimating first processing result information in accordance with first processing, using data regarding a target;

comparing second processing result data, for the data, obtained by second processing that differs from the first processing with the first processing result information; and detecting an anomaly of the second processing according to a result of the comparison.

A program according to an example aspect of the invention includes instructions that cause a computer to carry out:

an estimation function of estimating first processing result information in accordance with first processing, using data regarding a target;

an evaluation function of comparing second processing result data, for the data, obtained by second processing that differs from the first processing with the first processing result information; and a detection function of detecting an anomaly of the second processing according to a result of the comparison.

Furthermore, an example aspect of the invention is also realized by a computer-readable recording medium that records this program.

Advantageous Effects of the Invention

According to the anomaly detection apparatus and the like of the invention, an anomaly of a processing result can be detected.

EXAMPLE EMBODIMENTS

Figure 1:
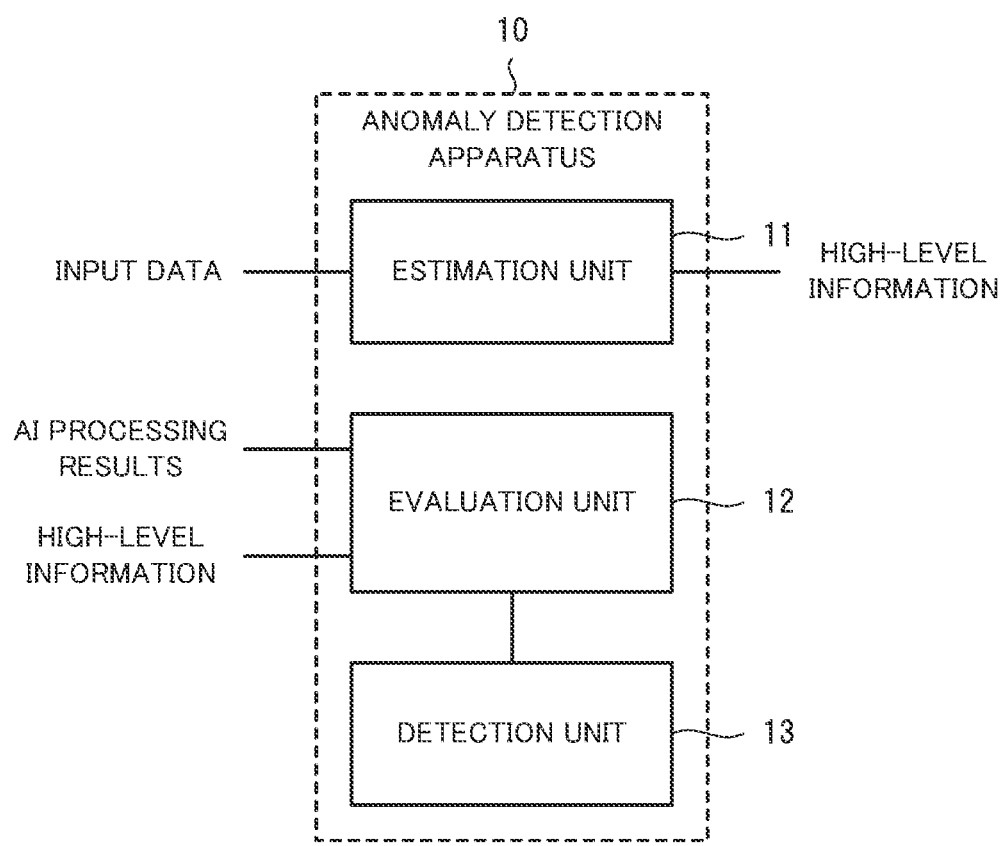
FIG. 1 is a diagram showing an example of an anomaly detection apparatus.

To begin with, a summary will be given in order to facilitate understanding of the embodiments that will subsequently be described. In the case where complex processing that requires human judgment is replaced by an AI, deterioration of prediction accuracy and prediction errors need to be prevented, even in (1) an environment where it is difficult to eliminate various uncertainties (e.g., noise, etc.) in the physical world, and (2) an environment in which there are unexperienced events that the AI has never experienced or learned (e.g., an environment where prediction data is heterogeneous to training data).

However, there is a limit to assuring the prediction accuracy of AIs. In view of this, the subsequent embodiments will describe a mechanism for objectively evaluating the processing results of an AI (subsequently referred to as "AI processing results"), and detecting whether the AI processing results are anomalous. In other words, AI processing results indicate results obtained by executing AI processing (processing results obtained by an AI).

In the subsequent embodiments, it is assumed that a criterion for determining whether AI processing results are anomalous is represented using the difference between a processing result generated by AI processing that uses observation data as an input and a result judged by a human, for example, based on the observation data.

For example, assume that image data observed by a sensor or an image capturing apparatus is input, and an object that is included in the image data is tracked by AI processing. However, in the case where the image data is processed by an AI, it is not always possible to grasp all of the states (e.g., three-dimensional space, temporal change, etc.) of the environments around the object. For example, the AI may not necessarily be able to continue tracking the object, in the case where the object is concealed by a concealing object. Also, in the case where a similar object having similar features to the object approaches the object in the image data, it is highly likely that a transfer (i.e., an event where the similar object is falsely determined to be the object) will occur in the AI.

In such a case, there is a problem in that anomalies of AI processing results cannot necessarily be detected correctly. The reason of this is that, in the case of AIs, it may not be possible to correctly determine the anomalies of AI processing results, in terms of involving mathematical processing results that are based on input data. That is, AIs are highly likely to be unable to correctly detect an object in the case where the object is concealed by a concealing object, and, furthermore, are also highly likely to be unable to correctly detect the object in the case where there is a similar object in the image data.

In contrast, humans comprehensively judge the environment around an object in the image data and specify the position of the object, with an understanding of factors such as the temporal continuity, the scene of the image data, the physical dynamics regarding the object, the constraint conditions, and the context (circumstance, background) in relation to the object. Accordingly, humans are able to track the object, even in the case where the object is concealed by a concealing object or where a similar object approaches the object.

Therefore, since the processing result obtained by an AI may differ from the judgment result by a human or the like, there is a problem in that the difference between the processing result obtained by the AI and the judgment result by the human or the like will be detected as an anomaly.

Patent Document 1 discloses a method that is able to prevent an object from being falsely identified or the position of the object from being erroneously identified, in the case where a phenomenon (so-called blown out highlights) occurs where, as a result of natural light being reflected by part of the object, display is performed with a loss in gradation in the reflected region, despite the image data including the entire object. The method disclosed in Patent Document 1 includes processing for extracting the high contrast region having blown out highlights, identifying the object, based on AI processing results in the case of further using a matching image whose brightness has been corrected, and specifying the position of the object.

However, with the method disclosed in Patent Document 1, there is a problem in that the determination result by a human or the like does not necessarily match the processing result obtained by the AI.

Also, the method disclosed in Patent Document 1 computes two different processing results for the same image data (information source). Accordingly, in the case where reliably relating to the information source is low and there are multiple uncertain elements such as in the case where the object is partially concealed in addition to having blown out highlights (environments such as (1) and (2) described above), there is a problem in that the correct processing result cannot be computed.

An AI disclosed in Patent Document 2 tracks an object in image data. The AI averts no longer being able to track the object in the case where the object is concealed by a concealing object, with respect to image data in which the object is captured from a certain viewpoint. The method disclosed in Patent Document 2 computes the possibility (likelihood) of the object in the processing result, based on the position of the object predicted at the time of observation and the position of the object in the image data actually observed at the time of observation, and compares the computed possibility with a predetermined threshold value.

However, even with the method disclosed in Patent Document 2, there is a problem in that the determination result obtained by a human or the like does not necessarily match the processing result obtained by the AI. Also, in the method disclosed in Patent Document 2, comparison of the predicted possibility of the object is made based on a predetermined threshold value, and the predetermined threshold value thus needs to be adjusted for every situation.

Through such a process, the inventor found problems with methods such as described above in that the difference between the AI processing result and the judgment result by a human or the like cannot be detected as an anomaly, and, moreover, came to derive a means of solving these problems.

That is, the inventor not only used the input/output relationship between the input data that is input to the AI and the processing results (output) of the AI processing, but also came to derive a means of determining whether AI processing results are anomalous, by detecting anomalies of the AI processing results, based on information (high-level information described later) obtained in accordance with processing that differs from the AI processing.

Furthermore, the inventor also found that this means can be applied to correcting or suspending the AI processing, using the judgment result of the AI processing result (information indicating whether the AI processing result is normal or anomalous).

First Example Embodiment

Hereinafter, a first example embodiment will be described, with reference to FIGS. 1 to 4.
[Apparatus Configuration]
Initially, the configuration of an anomaly detection apparatus 10 in this example embodiment will be described using FIG. 1. FIG. 1 is a diagram showing an example of an anomaly detection apparatus.

The anomaly detection apparatus 10 shown in FIG. 1 is a device for detecting anomalies in results of processing executed by an AI. Also, as shown in FIG. 1, the anomaly detection apparatus 10 has an estimation unit 11, an evaluation unit 12 and a detection unit 13.

The estimation unit 11 estimates high-level information (subsequently also referred to as "first processing result information", and described later with reference to "the DIKW pyramid") in accordance with processing (subsequently also referred to as "first processing") that differs from the AI processing (subsequently also referred to as "second processing"), using input data (first input data). The evaluation unit 12 evaluates the processing result, using a processing result (subsequently also referred to as "second processing result data") by the AI processing (subsequently also referred to as "second processing") that uses the input data as an input and the high-level information (high-level inference) estimated by the estimation unit 11. The detection unit 13 determines whether the AI processing result is anomalous based on the evaluation value (evaluation information) of the evaluation unit 12.

The input data is, for example, data relating to a control target such as an autonomous robot described later or a moving body.

Accordingly, the above-described processing can also be represented as follows. That is, the estimation unit 11 estimates the first processing result information in accordance with the first processing using data regarding the target. The evaluation unit 12 compares the second processing result data obtained by performing the second processing, which differs from the first processing, on the data regarding the target with the first processing result information. The detection unit 13 detects an anomaly of the second processing according to the comparison result.

In this way, in the first example embodiment, AI processing results (second processing result data obtained by second processing) can be evaluated using high-level information obtained by processing being performed on input data in accordance with a predetermined criterion, the high-level information (first processing result data obtained by first processing that differs from second processing) being equivalent to judgment results by humans or the like, and anomalies of AI processing results can thus be detected.

Accordingly, even in (1) an environment where it is difficult to eliminate various uncertainties in the physical world and (2) an environment in which there are unexperienced events that the AI has never experienced or learned, anomalies of AI processing results can be detected, and practical processing results can thus be obtained.

High-level information is information obtained by processing such as categorization or inference, for example, being performed on first input data. High-level information will be described in detail later.

AI processing (second processing) is processing that involves, for example, inputting prediction data into a model subjected to learning in advance using training data or a set (designed) model (e.g., relational expression, function, network, etc. in which feature amounts, criteria, threshold values, rules, etc. are set), and computing execution results for prediction, estimation (inference), determination (judgment), and the like. That is, the second processing can also be at least one of mathematical processing that uses data or statistical processing that uses data.

In the case where stochastic behavior is included in a predetermined model or a process for outputting processing results within the AI processing, the processing result of the AI processing is not deterministically determined. The reason for this is to improve adaptability and versatility with respect to unknown data, with the objective of inputting unknown data to the model and outputting processing results, the unknown data being different from data that is used when performing learning or setting of a model and whose input/output relationship is known.

[System Configuration]

Figure 2:
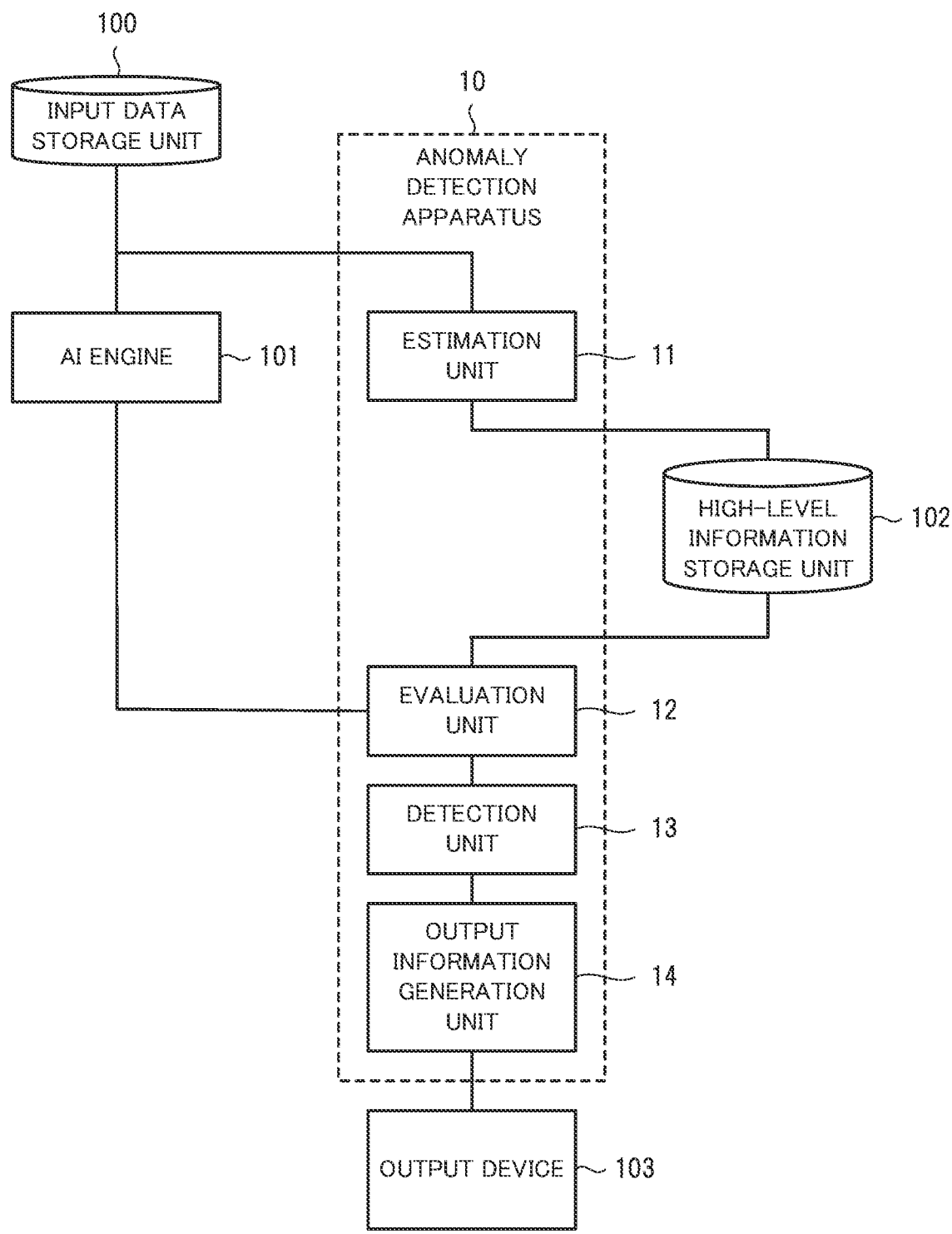
FIG. 2 is a diagram showing an example of a system having the anomaly detection apparatus.

The configuration of the anomaly detection apparatus 10 in the first example embodiment will be described more specifically using FIG. 2. FIG. 2 is a diagram showing an example of a system having the anomaly detection apparatus 10.

As shown in FIG. 2, the system of the first example embodiment has the anomaly detection apparatus 10, an input data storage unit 100, an AI engine 101, a high-level information storage unit 102, and an output device 103. The anomaly detection apparatus 10 has the estimation unit 11, the evaluation unit 12, the detection unit 13, and an output information generation unit 14.

The input data storage unit 100 stores data (first input data) to be input to the AI engine 101 that executes AI processing targeted for anomaly detection. The input data storage unit 100 can be realized using a storage device such as a database, for example. Also, the input data storage unit 100 may be provided anywhere within the system shown in FIG. 2. The input data storage unit 100 may be provided inside the anomaly detection apparatus 10, for example.

The input data is the two types of data shown below, for example. One type is data to be input to the AI engine 101 and used in AI processing. This input data is image data, moving image data, sensor data or the like acquired by a device such as a camera, video camera, various sensors or the like. This input data may also be data acquired regarding the target or control target, for example, using these devices. This input data is stored in the input data storage unit 100.

The other type is data for setting conditions for the AI processing in the AI engine 101, conditions for controlling processing in the AI processing, and the like. In this case, the input data is, for example, data indicating an objective for when performing AI processing relating to image recognition and moving image recognition, an objective for when performing AI processing relating to control or to information of the object or the like, or constraint conditions for when performing control. This data is acquired using the above-described devices. This data may, however, be input by an operator of the AI engine 101 or may be set in advance for every type of AI processing.

The AI engine 101 generates a model that is used in prediction processing in a learning mode, and executes processing regarding the input data using the model in an operation mode. For example, the AI engine 101 may be realized using an information processing apparatus such as a personal computer or a server computer, or may be realized using other hardware.

The AI processing related to the AI engine 101 is, for example, processing such as object detection, recognition, tracking, posture estimation, scene contextualization, object classification and segmentation, in fields relating to image recognition and moving image recognition. Also, in fields relating to control of autonomous robots, the AI processing is processing such as self-position estimation, map generation, motion planning and model prediction control.

Note that the AI processing generates prediction and inference (estimation) results by inputting data and performing processing represented by a predetermined operational expression on the data. The AI processing does not necessarily output the correct answer. Specifically, cases where the correct answer is not output includes the following two cases.

One case is a case where data that differs from when the model (relational expression) of the AI processing was subjected to learning or set is input, and a processing result is output without the correct answer being given. This case corresponds to processing such as the above-described object detection, recognition, tracking, posture estimation, scene contextualization, object classification and segmentation, as well as self-position estimation and map generation, for example.

The other case is a case where data collected before a certain point in time is input and values on and after that point in time are predicted. In this case, since the data that is input often changes over time, the values given with the input data often differ from the values at the time of prediction. Also, since the results of AI processing are values on and after a certain point in time, it is not possible to know future correct answers in the case where the certain point in time is in the future. This case corresponds to processing such as above-described motion planning and model prediction control.

Note that, in the example in FIG. 2, the information processing apparatus having the AI engine 101 and the anomaly detection apparatus 10 are separate devices, but the information processing apparatus having the AI engine 101 may include the anomaly detection apparatus 10.

The high-level information storage unit 102 stores high-level information estimated by the estimation unit 11. The high-level information storage unit 102 can be realized by a storage device such as a database, for example. Also, the high-level information storage unit 102 may be provided anywhere within the system shown in FIG. 2. For example, the anomaly detection apparatus 10 may include the high-level information storage unit 102.

The output information generation unit 14 outputs output information converted into a format in which the detection results generated by the detection unit 13 can be output, for example. The output device 103 acquires output information output by the output information generation unit 14 and outputs images, audio and the like externally in accordance with the acquired output information. The output device 103 is an image display device that uses liquid crystal, organic EL (electroluminescence) or CRTs (cathode ray tubes), for example. Furthermore, the image display device may also be provided with an audio output device such as a speaker or the like. The output device 103 may also be a printing device such as a printer.

The processing of the anomaly detection apparatus 10 will now be specifically described.

The estimation unit 11 acquires input data from the input data storage unit 100 and estimates high-level information (first processing result information) using the input data, in accordance with the first processing. The high-level information is information obtained by performing predetermined processing (e.g., categorization, inference, etc.) on the input data.

Specifically, the estimation unit 11, first, acquires input data from the input data storage unit 100. The estimation unit 11 estimates high-level information, using the acquired input data. The estimation unit 11 stores the estimated high-level information in the high-level information storage unit 102.

The first processing for estimating high-level information is realized by data mining or processing performed in accordance with the dynamics regarding the target, for example. Data mining is a neural network, clustering, a Bayesian network, SVM (Support Vector Machine) processing, regression, principal component analysis, or sparse modeling, for example. Data mining may also be a combination of algorithms. The first processing is different processing from the AI processing (second processing).

The neural network is a CNN (convolutional neural network), a DNN (deep neural network), an RNN (recurrent neural network), or a LSTM (long short-term memory), for example. The neural network may also be a combination of algorithms.

In summary, the first processing can also be at least one of processing for classifying data, processing for estimation using data, processing for extracting data tendencies, processing for extracting the relation between data, and processing for predicting the relation between data. Note that the first processing for estimating high-level information is not limited to the above-described method.

High-level information (first processing result information) will be specifically described using an example of the DIKW pyramid.

High-level information will be described using classification in the DIKW pyramid (DIKW model). DIKW is an acronym for Data, Information, Knowledge, and Wisdom. The DIKW model includes four layers, namely, a D layer, an I layer, a K layer, and a W layer. The D layer is a layer that includes unprocessed data, and includes data known as raw data, for example. The I layer is, for example, a layer including information that represents classification results obtained by data being classified in accordance with predetermined criteria, and includes information added to data. The K layer includes knowledge such as tendency, relevancy or regularity derived using information of the I layer or the like. The W layer includes wisdom such as know-how or expertise that is derived by utilizing the regularity, relevancy or the like of the K layer.

Data stored in the input data storage unit 100 corresponds to data of the D layer, and is data that is acquired by a data acquisition unit such as a camera or a sensor. In this case, high-level information is information, regularity or expertise of a higher layer (i.e., I layer, K layer, and W layer) than the data of the D layer in the DIKW pyramid. That is, high-level information can also be information of the I layer, knowledge of the K layer, or wisdom of the W layer.

Specifically, high-level information (first processing result information) is, for example, information obtained by data of the D layer being categorized in accordance with predetermined criteria, and information (e.g., regularity, tendency, know-how, etc.) extracted based on data of the D layer.

For example, in the field of image recognition or moving image recognition, high-level information (first processing result information) is information such as object dynamics, constraint conditions, scene context, or captions (headings, descriptions). For example, in the field of autonomous robots, high-level information is information such as the external environment, obstacles, the state of obstacles and the like, the objective of tasks that are imposed, the content of tasks, constraints on the operation range, and characteristics of the control device. High-level information can be represented using mathematical relational expressions (functions), value ranges and constraint conditions, for example.

High-level information (first processing result information) may be information in which the state of the environment is abstracted, based on data that is stored in the input data storage unit 100, for example. Specifically, the high-level information may be information indicating that an object having certain features exists in a certain position, using coordinate values indicating the certain position, or information indicating a dependency relationship whereby state B occurs following state A. These types of information are represented using logical expressions, graphs of graph theory and networks, for example. High-level information is not limited to the above-described examples.

Next, criteria for determining whether information belongs to high-level information will be described. Criteria for determining whether information belongs to high-level information are predetermined criteria including a first criterion and a second criterion shown below, for example.

The first criterion is a criterion that the dimension of high-level information be lower than the dimension of input data that is stored in the input data storage unit 100. For example, a dimension d (d is an integer of 2 or more) of the input data is represented by the product of a number m (m is an integer of 1 or more) of variables or components representing the features of the data and a number of pieces n (n is an integer of 2 or more) of the data (d=m×n). That is, the dimension of the data can be said to represent the size (data size) of the data. In this case, a dimension M of the high-level information satisfies the relationship of being less than the dimension d of the input data (M<d). That is, it can be said that the size of the high-level information is smaller than the size of the input data. That is, the first criterion indicates that the first processing result information is smaller in size than the input data.

The second criterion is a criterion that the information is not a subset of the input data. That is, this criterion is a criterion that the information be different from data obtained by sampling a portion of data from the input data (i.e., sampling data of the input data). According to the second criterion, a portion of data sampled from the input data is not high-level information. That is, it can also be said that the second criterion can be realized by determining whether the input data includes information or the like that is in the high-level information. Even though sampling data appears to satisfy the first criterion since the dimension is lower, the information has not been processed or converted (e.g., undergone categorization, inference, etc.), and is thus different from high-level information (first processing result information). In other words, sampling data can also be said to be data projected into a space in which the input data does not includes some of the variables representing features of the data. That is, the second criterion indicates that the first processing result information is different from a subset of the input data.

Next, processing for determining whether the above-described example belongs to high-level information in accordance with the first criterion and second criterion will be described.

It is assumed that the slope of the regression line and the positional change per unit time are derived using linear regression, as the dynamics of the object, using time series (T step, where T is a natural number) position data on a two-dimensional plane (2T dimension (=2 variables×T) as input data. In this case, the dimension of the derived slope and positional change is less than the dimension 2T of the input data and is different from sampling data of the input data. Accordingly, the derived slope and positional change belong to high-level information (first processing result information), in accordance with the first criterion and second criterion.

Next, processing for making a determination in accordance with the first criterion and second criterion in the case of generating a caption from image data will be described.

The input data is image data. Since the image data includes numerous pixels, the dimension of the image data is high. A caption is generated by processing for extracting a feature amount of image data from such input data, in accordance with CNN, for example, and combining words estimated (predicted) from the image data using LSTM. The generated caption includes a lower number of pixels (i.e., lower dimension) than the input data and is different from sampling data sampled from the input data. Accordingly, the caption corresponds to high-level information, in accordance with the first criterion and second criterion.

Next, the relationship between AI processing by the AI engine 101 and high-level information (first processing result information) will be described.

The AI processing involves inputting input data that is stored in the input data storage unit 100 (i.e., data of the D layer in the DIKW pyramid) and generating processing results (second processing result data) for the input data.

Specifically, the AI processing performs prediction, estimation (inference), determination (judgment) and the like, by applying predetermined processing such as a learned or set (designed) model (relational expression, function), a network or the like to the input data. That is, the AI processing is also able to process input data, in accordance with processing represented by a function, network or the like.

According to the DIKW model, the AI processing results can also be data of the D layer or information of the I layer. However, in this specification, for convenience of description, these AI processing results will be collectively represented as second processing result data.

As described above, high-level information (first processing result information) is generated by the estimation unit 11, based on input data. Also, the AI engine 101 may generate knowledge of the K layer or wisdom of the W layer, both of which are higher layers than the I layer, by repeatedly performing inference or processing of information.

In the case where the AI processing result (second processing result data) is data of the D layer, the anomaly detection apparatus 10 executes processing such as will be described later with reference to FIG. 3, using high-level information (first processing result information) of a higher level than the information of the I layer. Also, in the case where the result of the AI processing is information of the I layer, the anomaly detection apparatus 10 executes processing such as will be described later with reference to FIG. 3, using knowledge of the K layer or wisdom of the W layer. That is, the anomaly detection apparatus 10 detects an anomaly of an AI processing result, using information (subsequently referred to as "high-level information") of a higher level than the AI processing result.

In this way, high-level information is information that can be utilized in processing for detecting anomalies of AI processing results.

The evaluation unit 12 acquires an AI processing result from the AI engine 101 and acquires high-level information from the high-level information storage unit 102. The evaluation unit 12 evaluates the AI processing result, based on the AI processing result and the high-level information, and computes an evaluation value thereof. The evaluation unit 12 outputs the computed evaluation value to the detection unit 13.

An evaluation method relating to the DIKW pyramid will now be described.

In the case of classifying data based on the DIKW pyramid, the AI engine 101 computes an AI processing result, by inputting input data of the D layer and executing predetermined processing on the input data.

In this case, the AI processing result is data of the D layer or information of the I layer. As described above, high-level information is information of the I layer, knowledge of the K layer or wisdom of the W layer. Subsequently, data of the D layer, information of the I layer, knowledge of the K layer and wisdom of the W layer may also be collectively referred to as "information".

In the DIKW pyramid example, the evaluation unit 12 computes an evaluation value for the AI processing result, using "information" of two different levels. That is, the evaluation unit 12 outputs an evaluation value indicating the degree to which the AI processing result diverges from the high-level information (or the degree to which the AI processing result conforms to the high-level information). The evaluation unit 12 may, further, compare the computed evaluation value with a predetermined reference value for determining whether the AI processing result is anomalous, and determine whether the AI processing result is anomalous, according to the comparison result. Due to such processing, the evaluation unit 12 is able to determine whether an anomaly has occurred in the AI processing result.

As an example, an evaluation method relating to tracking an object in an image capturing range of the camera will be described.

In the case where the object is concealed by an obstacle or the like or where the image of the object has blown out highlights due to reflection of light on the object or the like, the AI processing may not be able to track the object, and data representing the object may stop being received. In the case where the anomaly detection apparatus 10 according to this example embodiment is not used, it is difficult to determine an anomaly of the AI processing result in such a situation.

For convenience of description, the AI processing result (second processing result data) is assumed to be a tracking data for an object. Also, the high-level information (first processing result information) is assumed to be dynamics representing the movement of the object. The high-level information may, further, include constraint conditions regarding the position of the object.

As a result, in the above example regarding tracking of an object, the object will not appear in an AI processing result that is based on image data obtained from a camera, despite it being determined that the object is within the image capturing range of the camera, if determination is performed in accordance with high-level information such as constraint conditions regarding the position of the object or dynamics indicating that the object is moving. Accordingly, since the AI processing result and the high-level information are not consistent (do not conform), the detection unit 13 determines that the AI processing result is anomalous. That is, the detection unit 13 detects an anomaly of the AI processing (second processing).

An evaluation method relating to a process of sensory integration will now be described as another evaluation method.

The process of sensory integration that occurs in the brain of humans and other living organisms is processing for integrating information (sensations) from outside that enters through sensory organs such as the eyes, ears and hands with information (perception) recognized/comprehended by the brain.

Input data to the AI engine 101 is assumed to be data obtained by the information (sensations) entering through the sensory organs being quantified. The AI engine 101 analyzes the tendency of the sensations by applying AI processing to the data and outputs an AI processing result. Also, high-level information is assumed to be information for recognizing/comprehending sensations entering through the sensory organs by the brain. The anomaly detection apparatus 10 compares the AI processing result with the high-level information (perception), and detects an anomaly of the AI processing result, based on the comparison result.

Processing that involves the evaluation unit 12 quantitatively computing the extent (degree) to which an AI processing result conflicts with (conforms to) high-level information will now be specifically described.

The evaluation unit 12 quantitatively computes the extent to which there is conflict (conformity), using a probability distribution, for example. For convenience of description, the AI processing result (second processing result data) is a posterior probability distribution $P(x|y)$ for input data $P(y)$ that is input. The high-level information (first processing result information) is assumed to be a probability distribution $P(z)$ of a feature amount z that is based on preconditions and regularity. Note that $P(A)$ represents the probability of A occurring. $P(B|A)$ represents the probability of B occurring in the case where (under the condition where) A occurs, and is called a conditional probability or a posterior probability.

The evaluation value is, for example, information representing the degree of conflict (or conformity or possibility) of the AI processing result $P(x|y)$ with respect to the high-level information $P(z)$. The evaluation value can also be represented using a likelihood $P(z|x,y)$. The degree of conflict between the AI processing result and the high-level information is lower as the likelihood increases, and the degree of conflict is higher as the likelihood decreases. In other words, it can also be said that the evaluation unit 12 computes the degree (extent) to which the first processing result information will be obtained in the case where the second processing result data is obtained.

The evaluation unit 12 may compute the evaluation value using KL (Kullback-Leibler) divergence (KL information amount), or may compute the evaluation value in accordance with a technique such as cluster analysis. In the case of computing the evaluation value using a cluster analysis technique, the evaluation unit 12 may compute the distance (e.g., Euclidean distance, Mahalanobis distance, cosine distance, etc.) between the AI processing result (second processing result data) and the high-level information (first processing result information) as the evaluation value.

With an evaluation value that is based on the KL information amount or distance described above, the degree of conformity is higher as the value decreases. Also, the degree of conformity is lower as the value increases. That is, the degree to which there is conflict is lower as the value decreases. Conversely, the degree to which there is conflict is higher as the value increases. In summary, the probability (likelihood) of the first processing result information being obtained in the case where the second processing result data is obtained is a likelihood, information amount, or distance.

The detection unit 13 determines whether the AI processing result is anomalous, based on the evaluation value computed by the evaluation unit 12. Specifically, the detection unit 13 acquires an evaluation value from the evaluation unit 12. The detection unit 13 determines whether the AI processing result is anomalous, according to the acquired evaluation value. For example, the detection unit 13 computes the determination result relating to the AI processing result, by comparing the evaluation value with a predetermined criterion for determining whether there is an anomaly. The detection unit 13 outputs the computed determination result to the output information generation unit 14.

In other words, the detection unit 13 compares an evaluation value such as likelihood, information amount or distance described above with a predetermined criterion for judging an anomaly, and determines whether the AI processing result is anomalous according to the comparison result, for example. The threshold value is appropriately determined, based on testing, simulation or experience, for example.

Note that in order to determine an anomaly of an AI processing result, based on an evaluation value represented by likelihood, information amount, distance or the like, it is necessary to set a predetermined criterion or a threshold value. In the case where the difference of the evaluation value is small or where the evaluation value varies according to environmental change, passage of time or the like, there are cases where a predetermined criterion is not necessarily appropriate for determining an anomaly.

However, since the evaluation unit 12 evaluates AI processing results and compares "information" of different levels, based on the same input data, a technique can be designed for computing the evaluation value such that the difference of the evaluation value is sufficiently large with respect to whether or not there is an anomaly. Accordingly, it is unlikely that the threshold value will need to be adjusted for every situation, or that the accuracy of the anomaly determination will depends on the setting accuracy of the threshold value.

The output information generation unit 14 generates output information for outputting the determination result determined by the detection unit 13 to the output device 103, and outputs the generated output information to the output device 103. Note that the output information generation unit 14 may generate output information for outputting input data, processing results, high-level information, evaluation values and the like, and output the generated output information to the output device 103.

[Apparatus Operations]

Next, operations of the anomaly detection apparatus 10 in the first example embodiment will be described using FIG. 3. FIG. 3 is a diagram showing an example of operations of the anomaly detection apparatus 10. In the following description, FIG. 2 will be referred to as appropriate. Also, in the first example embodiment, processing in accordance with the anomaly detection method is implemented by operating the anomaly detection apparatus 10. Therefore, description of the anomaly detection method in the first example embodiment is replaced by the following description of the operations of the anomaly detection apparatus 10.

Figure 3:
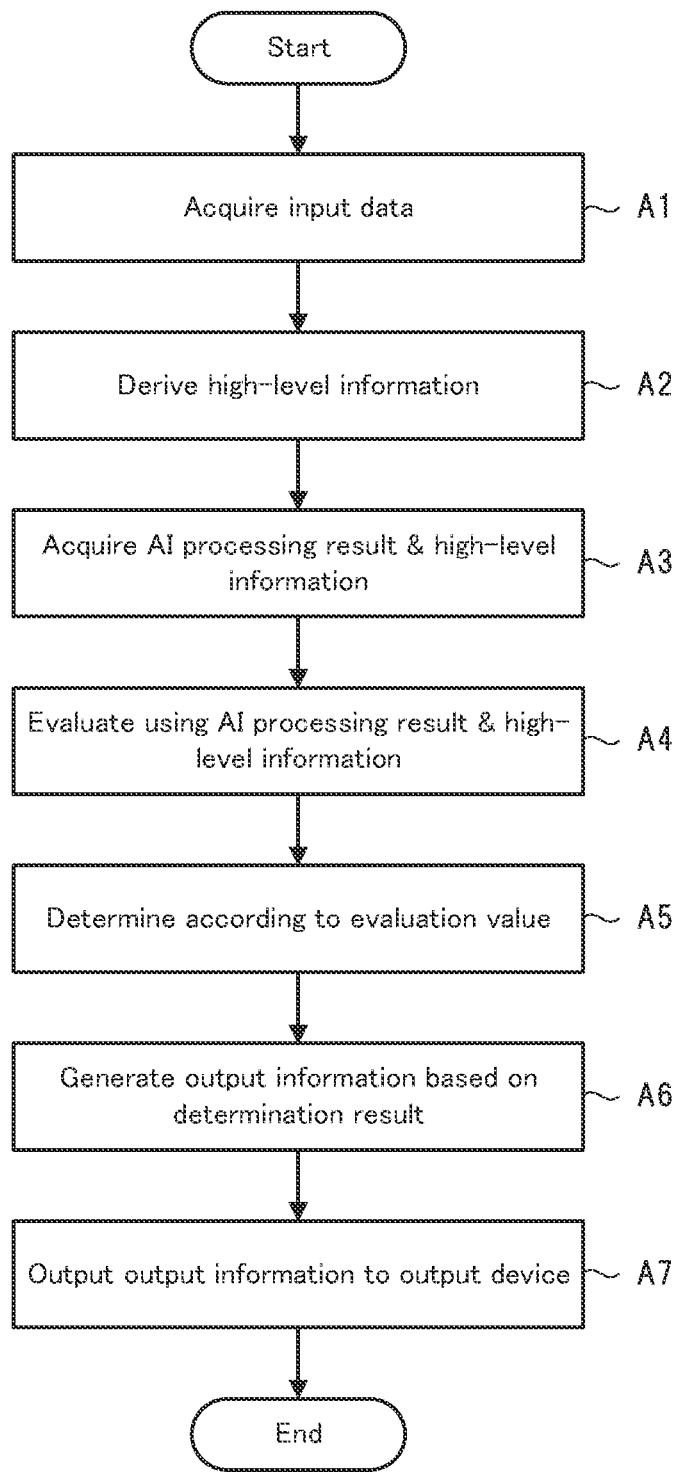
FIG. 3 is a diagram showing an example of operations of the anomaly detection apparatus.

As shown in FIG. 3, initially, the estimation unit 11 acquires input data stored in the input data storage unit 100 (step A1). Note that the input data is, for example, input data to the AI engine 101, information that is used in the AI processing, and information for setting conditions and the like in the AI processing of the AI engine 101. Note that the processing contents of the AI engine 101, the frequency at which input data is acquired and the like are not limited.

The estimation unit 11 estimates the high-level information (first processing result information) in accordance with the first processing, using the acquired input data (step A2). As described above, the high-level information is, for example, information obtained by categorizing input data in accordance with a predetermined criterion, or information obtained by applying processing such as inference to the input data. Note that the frequency of estimating and storing high-level information is not limited, and may differ from the frequency of AI processing by the AI engine 101.

Specifically, in step A2, the estimation unit 11 estimates high-level information, by executing processing such as data mining or a neural network, for example, on the acquired input data. The estimation unit 11 stores the estimated high-level information in the high-level information storage unit 102.

The evaluation unit 12 acquires an AI processing result from the AI engine 101 and acquires high-level information from the high-level information storage unit 102 (step A3).

The evaluation unit 12 computes (evaluates) the degree (extent) to which the AI processing result conforms to (or conflicts with) the high-level information, using the AI processing result and the high-level information (step A4). Specifically, in step A4, the evaluation unit 12 derives an evaluation value representing the degree to which the AI processing result conflicts with the high-level information, by executing a processing method that is based on the probability distribution or the like on the AI processing result and the estimated high-level information. The evaluation unit 12 outputs the evaluation value to the detection unit 13.

As a method of quantitatively computing the extent to which there is conflict, there is a method that uses probability distributions, for example. The AI processing result is assumed to be represented using the posterior probability distribution $P(x|y)$ for the input data $P(y)$ that is input. The high-level information is assumed to be represented using the probability distribution $P(z)$ of the feature amount z that is based on preconditions and regularity.

The evaluation value is obtained by computing an evaluation value representing the degree of conflict (conformity, possibility) of the AI processing result $P(x|y)$ with respect to the high-level information $P(z)$, in accordance with processing for computing the likelihood $P(z|x,y)$, for example. The degree of conflict is lower as the likelihood increases. The degree of conflict is higher as the likelihood decreases.

As for the method of computing the evaluation value, a technique using KL divergence (KL information amount) or a cluster analysis technique, for example, may be used. The evaluation unit 12 executes processing in accordance with a cluster analysis technique, using input data, for example. The evaluation unit 12 may compute the distance between samples (e.g., Euclidean distance, Mahalanobis distance, cosine distance, etc.) as the evaluation value, for example.

With the above-described KL information amount or an evaluation value based on distance, the degree of conformity is higher as the value decreases. That is, the degree of conflict is smaller as the value decreases. The degree of conflict is higher as the value increases.

The detection unit 13 determines whether the AI processing result is anomalous according to an evaluation value (step A5). Specifically, in step A5, the detection unit 13 acquires the evaluation value from the evaluation unit 12. The detection unit 13 determines whether the AI processing result is anomalous, according to the acquired evaluation value. The detection unit 13 outputs the determination result to the output information generation unit 14.

The detection unit 13 compares an evaluation value such as likelihood, information amount or distance described above with a threshold value representing a criterion for determining whether the AI processing result is anomalous, and determines whether the AI processing result is anomalous according to the comparison result, for example. The threshold value can be appropriately determined based on testing, simulation or experience, for example.

The output information generation unit 14 generates output information for outputting the determination result and the like to the output device 103 (step A6) and outputs the generated output information to the output device 103 (step A7). Note that, in step A6, the output information generation unit 14 may generate output information for outputting input data, processing results, high-level information, evaluation values and the like, and output the generated output information to the output device 103.

Effects of First Example Embodiment

As described above, in the case where processing that directly affects the physical world is entrusted with AI engines and AI algorithms, there is a problem in that accuracy may deteriorate and misjudgment may occur with respect to unexperienced events in environments in which there is uncertainty; that is, the results of AI processing cannot be guaranteed. However, this problem can be overcome by using the anomaly detection apparatus of the first example embodiment.

In the first example embodiment, an anomaly of an AI processing result is determined by comparing the AI processing result created from input data to an AI engine with high-level information (information obtained through some sort of organizing, information processing, inference, etc.) created in relation to the input data.

In the first example embodiment, the AI processing result (second processing result data) is evaluated using high-level information (first processing result information) obtained by processing being executed on input data in accordance with a predetermined criterion. Accordingly, the AI processing result is evaluated using "information" of different levels, and anomalies of AI processing results can thus be detected.

Accordingly, even in (1) an environment where it is difficult to eliminate various uncertainties in the physical world and (2) an environment in which there are unexperienced events that the AI has never experienced and learned, anomalies of AI processing results can be detected using "information" of different levels, and practical processing results can thus be obtained.

[Program]

A program in the first example embodiment need only be a program that causes a computer to execute steps A1 to A7 shown in FIG. 3. The anomaly detection apparatus and the anomaly detection method in the first example embodiment can be realized by this program being installed on a computer and executed. In this case, a processor of the computer executes processing while functioning as the estimation unit 11, the evaluation unit 12, the detection unit 13 and the output information generation unit 14.

Also, the program in the first example embodiment may be executed by a computer system constructed from a plurality of computers. In this case, for example, the computers may each function as one of the estimation unit 11, the evaluation unit 12, the detection unit 13, and the output information generation unit 14.

Example 1

An example of the anomaly detection apparatus 10 of the first example embodiment will be described.

Figure 4:
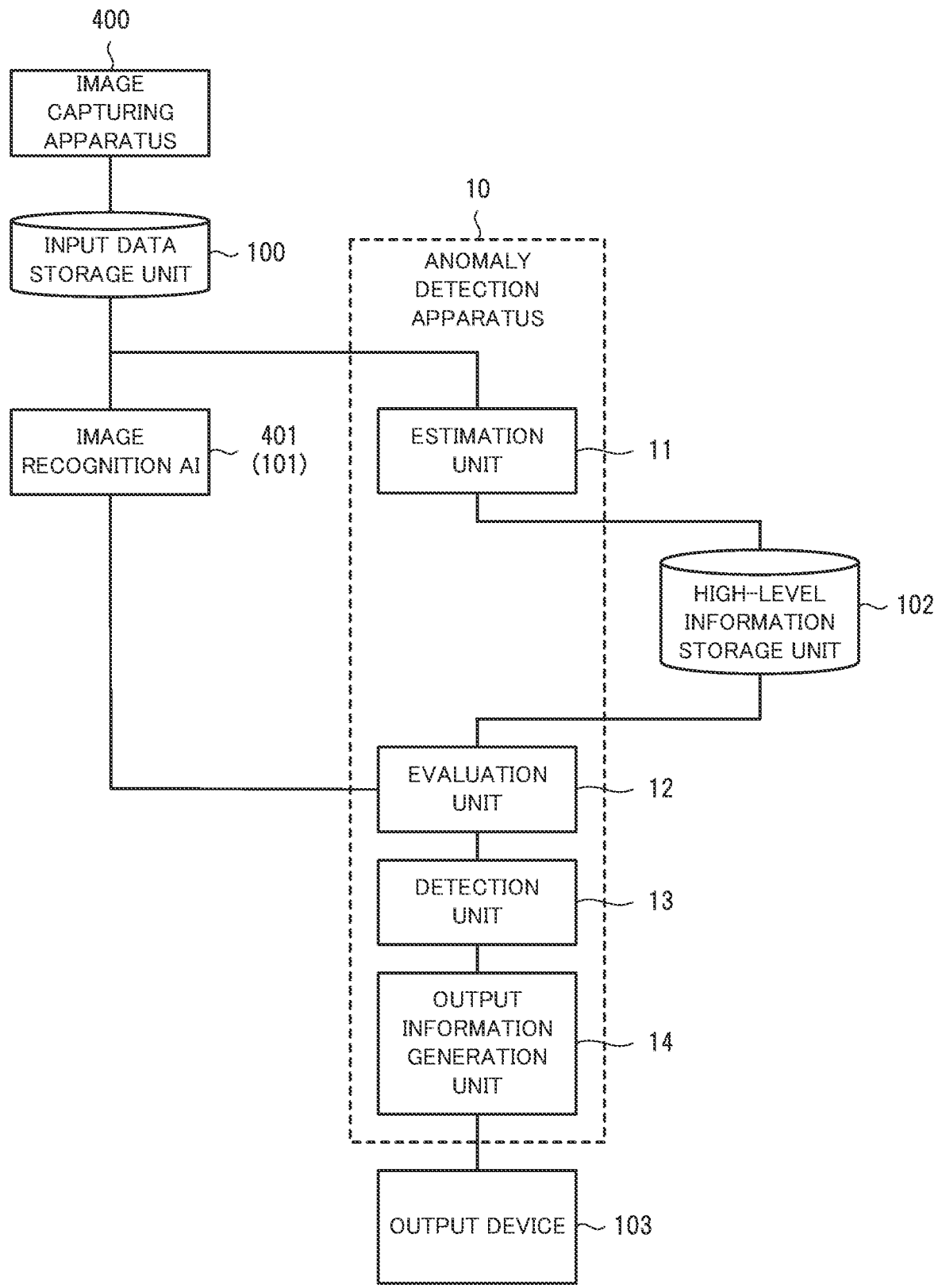
FIG. 4 is a diagram showing an example of an image recognition system.

FIG. 4 is a diagram showing an example of an image recognition system. The image recognition system shown in FIG. 4 has the anomaly detection apparatus 10, an image capturing apparatus 400, the input data storage unit 100, an image recognition AI 401 (AI engine), the high-level information storage unit 102, and the output device 103.

The image capturing apparatus 400 is a camera (including monocular, compound eye, monochrome, RGB, or depth camera, etc.) or a video camera, for example. The image capturing apparatus 400 need only be a device that is able to capture images such as still images or moving images, and a plurality of cameras may be combined. Also, the image capturing apparatus 400 is communicably connected to the input data storage unit 100 of the first example embodiment. The image capturing apparatus 400 stores captured image data in the input data storage unit 100.

The image recognition AI 401 corresponds to the AI engine 101 of the first example embodiment. The image recognition AI 401 is a device having functions of an AI that executes image recognition processing. The image recognition AI 401 acquires still image data or moving image data as input data from the input data storage unit 100, executes image recognition processing (second processing) such as object detection, recognition, tracking, posture estimation, scene classification, object classification or segmentation using the acquired input data, and outputs a processing result (i.e., AI processing result, second processing result data). The processing in the image recognition AI 401 is, however, not limited to the above-described processing.

The estimation unit 11 acquires still image data or moving image data as input data from the input data storage unit 100, estimates high-level information (first processing result information) in accordance with the first processing using the acquired input data, and stores the estimated high-level information in the high-level information storage unit 102.

The evaluation unit 12 evaluates the AI processing result, similarly to the operations of the first example embodiment, using the processing result of the image recognition AI 401 and the estimated high-level information, and outputs an evaluation value to the detection unit 13.

The detection unit 13 determines whether the AI processing result is anomalous, based on the evaluation value, and outputs the determination result to the output information generation unit 14.

The output information generation unit 14 generates output information for outputting input data, processing results, high-level information, evaluation values, determination results and the like to the output device 103, and outputs the generated output information to the output device 103.

In this way, by applying the anomaly detection apparatus 10 to an image recognition system, it can be determined that an AI processing result by the image recognition AI 401 is anomalous. The anomaly detection apparatus 10 can also be applied to anomaly detection such as processing for measuring distance based on data, with sensing data obtained by a lidar (Light Detection and Ranging), a radar (Radio Detection and Ranging), a laser or the like as an input, for example.

Second Example Embodiment

Figure 5:
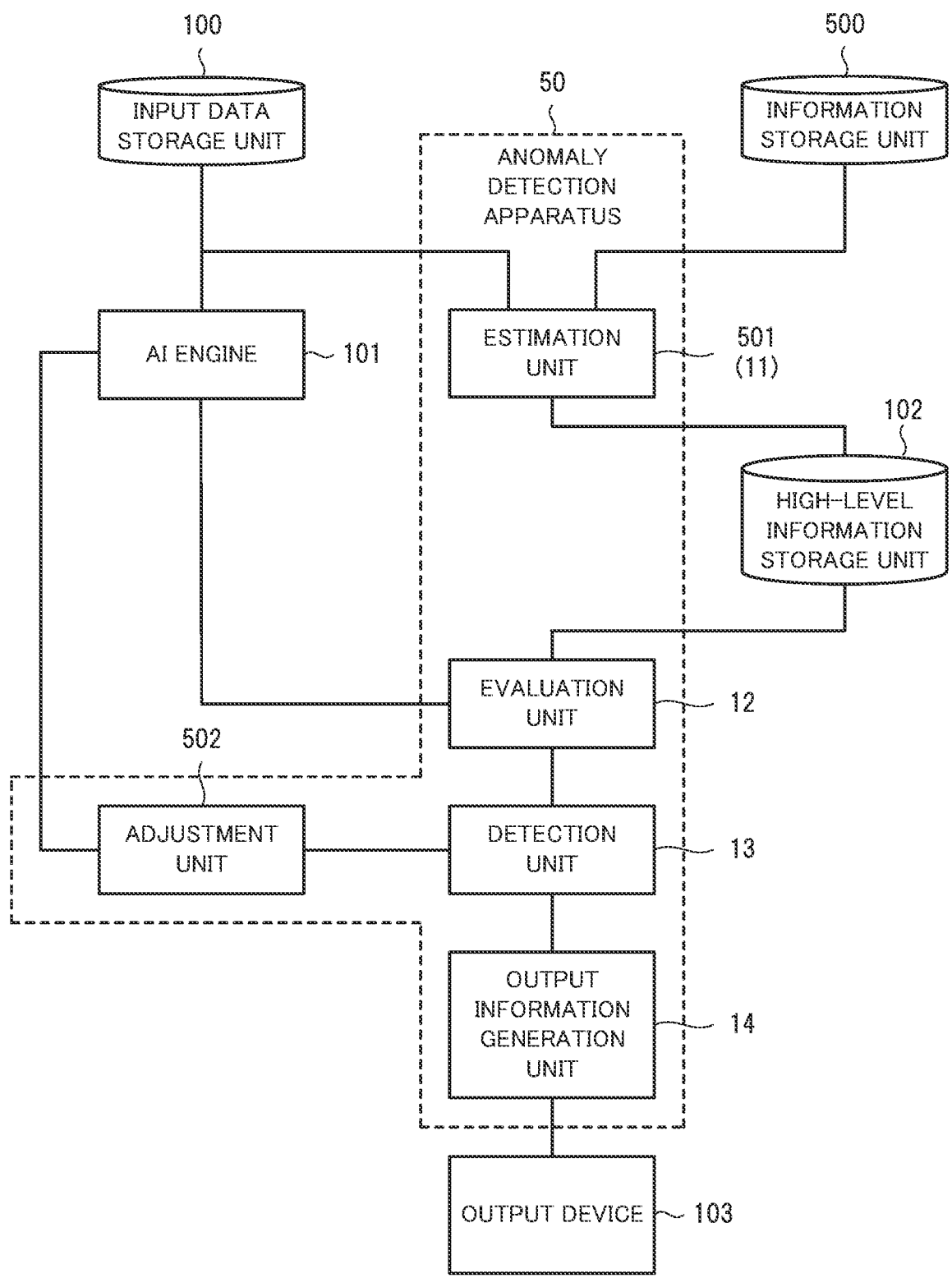
FIG. 5 is a diagram showing an example of a system having an anomaly detection apparatus.

Hereinafter, a second example embodiment will be described, with reference to FIGS. 5 to 8.
[System Configuration]
The configuration of an anomaly detection apparatus 50 in the second example embodiment will be specifically described using FIG. 5. FIG. 5 is a diagram showing an example of a system having the anomaly detection apparatus.

As shown in FIG. 5, the system in the second example embodiment has the anomaly detection apparatus 50, the input data storage unit 100, the AI engine 101, the high-level information storage unit 102, the output device 103, and an information storage unit 500. The input data storage unit 100, the AI engine 101, the high-level information storage unit 102 and the output device 103 are described in the first example embodiment, and description thereof will thus be omitted.

Furthermore, the anomaly detection apparatus 50 has an estimation unit 501 corresponding to the estimation unit 11 of the first example embodiment, the evaluation unit 12, the detection unit 13, the output information generation unit 14, and an adjustment unit 502. The evaluation unit 12, the detection unit 13 and the output information generation unit 14 are described in the first example embodiment, and description thereof will thus be omitted. Note that the system need not include the output information generation unit 14 and the output device 103.

The information storage unit 500 stores information that is input to the estimation unit 11. The information storage unit 500 is a storage device such as a database, for example. Also, the information storage unit 500 may be provided anywhere within the system shown in FIG. 5. For example, the anomaly detection apparatus 50 may include the information storage unit 500.

The information storage unit 500 does not store input data (first input data) that is input to the AI engine 101, unlike the input data storage unit 100, and stores input data (second input data) that is input to the estimation unit 501. That is, the first input data is different data from the second input data.

The second input data is, for example, past observation data, prior knowledge about the target of the AI processing, prior information or the like. The second input data may also be past image data, moving image data, sensor data, feature amounts relating to objects, feature amounts relating to phenomena, tendencies, or machine learning results, for example. The second input data may also be a combination of these types of information.

The estimation unit 501 estimates high-level information, using the first input data and second input data. Specifically, the estimation unit 501 estimates high-level information in a similar manner to the estimation unit 11 described in the first example embodiment. That is, the estimation unit 501 estimates first processing result information in accordance with the first processing, using the second input data which differs from the first input data.

Note that, in the example in FIG. 5, a configuration is shown in which the first input data is input to the estimation unit 501 from the input data storage unit 100 and the second input data is input to the estimation unit 501 from the information storage unit 500, but the second input data may be input to the estimation unit 501 from only the information storage unit 500. Furthermore, the frequency and period for inputting the first and second input data may be the same or may be different.

The adjustment unit 502 acquires the determination result determined by the detection unit 13, generates adjustment information for adjusting the AI engine 101, and outputs the generated adjustment information. Specifically, in the case where the detection unit 13 determines that the AI processing result is anomalous, the adjustment unit 502 creates adjustment information for adjusting a condition or parameter of the AI processing in the AI engine 101, and feeds the created adjustment information back to the AI engine 101. Due to such processing, the adjustment unit 502 controls processing by the AI engine 101 such that the processing result of the AI engine 101 is determined to be normal.

The adjustment unit 502 performs processing on the AI engine 101 to change the threshold value of determination by an algorithm or the luminance of the camera for when executing AI processing relating to image recognition and moving image recognition, for example, using the adjustment information. The adjustment unit 502 changes the path plan or constraint conditions for when executing AI processing relating to control.

A parameter update technique relating to the AI engine 101 uses an evaluation function to represent the relation between the evaluation value of the detection unit 13 and parameters relating to the AI processing (second processing) of the AI engine 101, and can be realized in accordance with a technique such as a gradient method of estimating parameter adjustment information, based on the differential value of the evaluation function with respect to parameters, for example. In other words, the adjustment unit 502 generates adjustment information representing the values of parameters (or conditions) that depend on the comparison result, in accordance with the relation between an evaluation value obtained as a result of comparing the first processing result information and the second processing result data and parameters of the second processing or conditions of the second processing.

Thereafter, the AI engine 101 executes AI processing adjusted in accordance with the adjustment information. The anomaly detection apparatus 50 determines whether the AI processing result obtained after adjustment is anomalous. Such processing may be executed repeatedly. The AI processing result by the AI engine 101 can be normalized, by repeating the above-described processing until the anomaly is no longer detected.

[Apparatus Operations]

Figure 6:
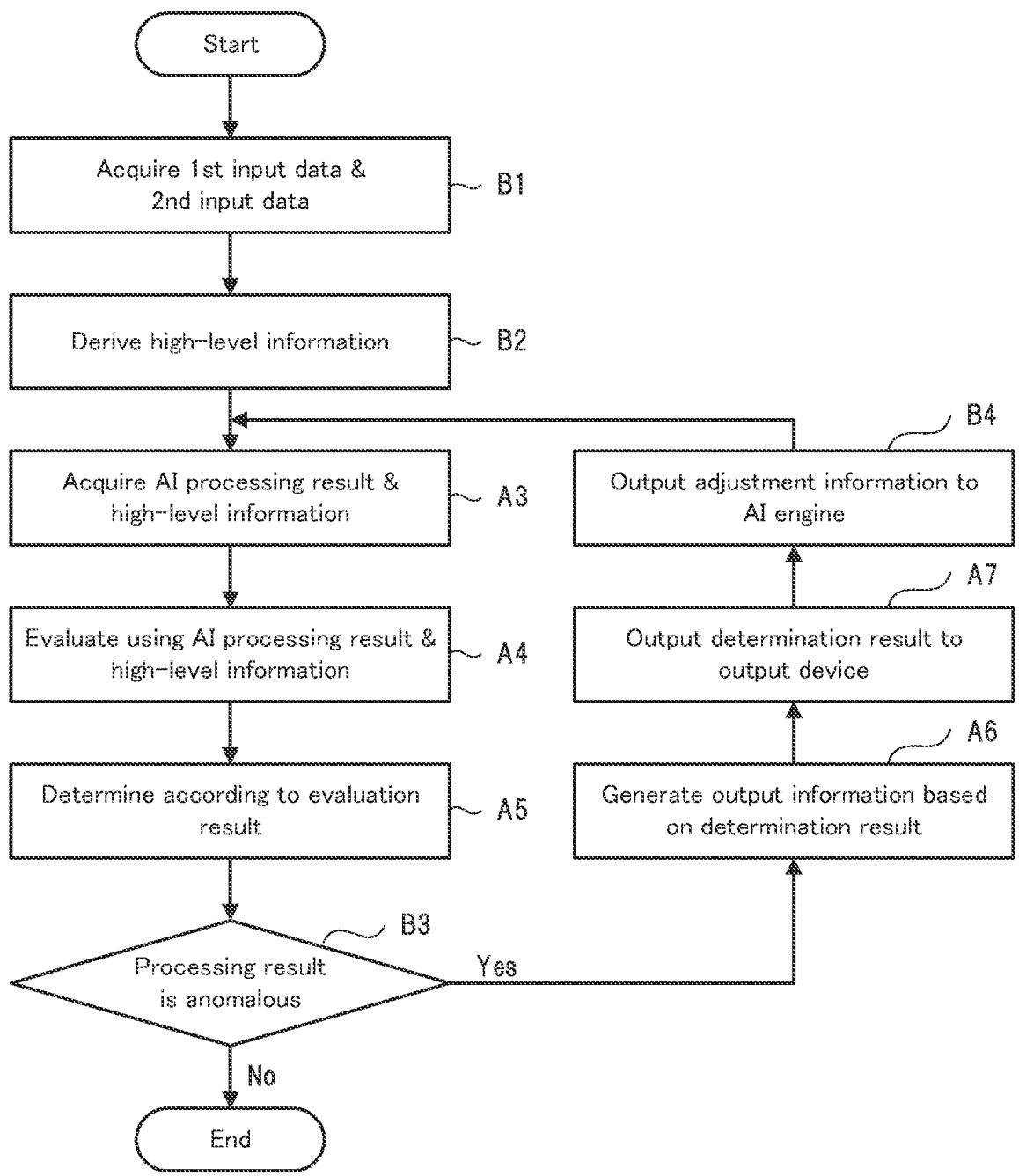
FIG. 6 is a diagram showing an example of operations of the anomaly detection apparatus.

Next, operations of the anomaly detection apparatus 50 in the second example embodiment will be described using FIG. 6. FIG. 6 is a diagram showing an example of operations of the anomaly detection apparatus 50. In the following description, FIG. 5 will be referred to as appropriate. Also, in the second example embodiment, processing in accordance with the anomaly detection method is executed by operating the anomaly detection apparatus 50.

As shown in FIG. 6, initially, the estimation unit 501 acquires input data (first input data) stored in the input data storage unit 100 and input data (second input data) to be input to the estimation unit 501 (step B1).

The first input data is information that is used as input data for AI processing that is executed by the AI engine 101. The input data is, for example, data that is used in AI processing and setting data for setting conditions of the AI processing in the AI engine 101.

The second input data is past observation data, prior knowledge about the target of the AI processing, prior information or the like. The second input data may also be past image data, moving image data, sensor data, feature amounts relating to objects, feature amounts relating to phenomena, tendencies, or machine learning results, for example. The second input data may also be a combination of these types of information.

Note that, in the example in FIG. 5, the estimation unit 501 inputs input data from the input data storage unit 100 and the information storage unit 500, but input data may be input from only the information storage unit 500. Furthermore, the frequency and period for inputting the first and second input data may be the same or may be different.

The estimation unit 501 estimates high-level information, using the first input data and second input data (step B2). Specifically, in step B2, the estimation unit 501 estimates high-level information by executing similar processing to the estimation unit 11 described in the first example embodiment.

Thereafter, the anomaly detection apparatus 50 executes the processing of steps A3 to A5 as described using FIG. 3. In step A5, if it is determined that the AI processing result is anomalous (step B3: Yes), the processing shown in step A6 is executed. Note that if it is determined that there is no anomaly in the AI processing result (step B3: No), the processing transitions to step B1, and the processing from steps B1, B2 to A3 to A5, B3, A6, A7 and B4 is repeated.

In step B3, if an anomaly of the AI processing result is detected, the adjustment unit 502, in step B4, acquires the determination result determined by the detection unit 13, and outputs the adjustment information computed based on the determination result to the AI engine 101, in addition to the processing of steps A6 and A7 described using FIG. 3.

Specifically, if the detection unit 13 determines that the AI processing result is anomalous, the adjustment unit 502, in step B4, computes adjustment information such as a condition or parameter of the AI processing in the AI engine 101, and feeds the computed adjustment information back to the AI engine 101. Conditions, parameters and the like of the AI processing in the AI engine 101 may be computed. As a result of such processing, the adjustment unit 502 controls the AI engine 101 such that the AI processing result is not determined to be anomalous.

Note that the processing of steps A6 and A7 need not be performed, or the processing of steps A6 and A7 may be executed after executing the processing of step B4.

Effects of Second Example Embodiment

The anomaly detection apparatus 50 according to the second example embodiment evaluates AI processing results using high-level information that is created by executing processing on input data in accordance with predetermined criteria. Accordingly, it is determined whether an AI processing result is anomalous based on the degree to which the AI processing result conforms to "information" of a higher level than the AI processing result, and an anomaly of the AI processing result can thus be correctly detected.

Accordingly, even in (1) an environment where it is difficult to eliminate various uncertainties in the physical world and (2) an environment in which there are unexperienced events that the AI has never experienced or learned, anomalies of AI processing results can be detected, and practical processing results can thus be obtained.

Furthermore, according to the second example embodiment, the anomaly detection apparatus 50 estimates high-level information, using information that is not used in the AI engine 101, by using the second information from the information storage unit 500.

[Program]

A program in the second example embodiment need only be a program that causes a computer to execute steps B1, B2, A3 to A5, B3, A6, A7 and B4 shown in FIG. 6. The anomaly detection apparatus and the anomaly detection method in the second example embodiment can be realized by this program being installed on a computer and executed. In this case, a processor of the computer executes processing while functioning as the estimation unit 501, the evaluation unit 12, the detection unit 13, the output information generation unit 14 and the adjustment unit 502.

Also, the program in the second example embodiment may be executed by a computer system constructed from a plurality of computers. In this case, for example, the computers may each function as one of the estimation unit 501, the evaluation unit 12, the detection unit 13, the output information generation unit 14 and the adjustment unit 502.

Example 2

An example of the anomaly detection apparatus of the second example embodiment will be described.

Figure 7:
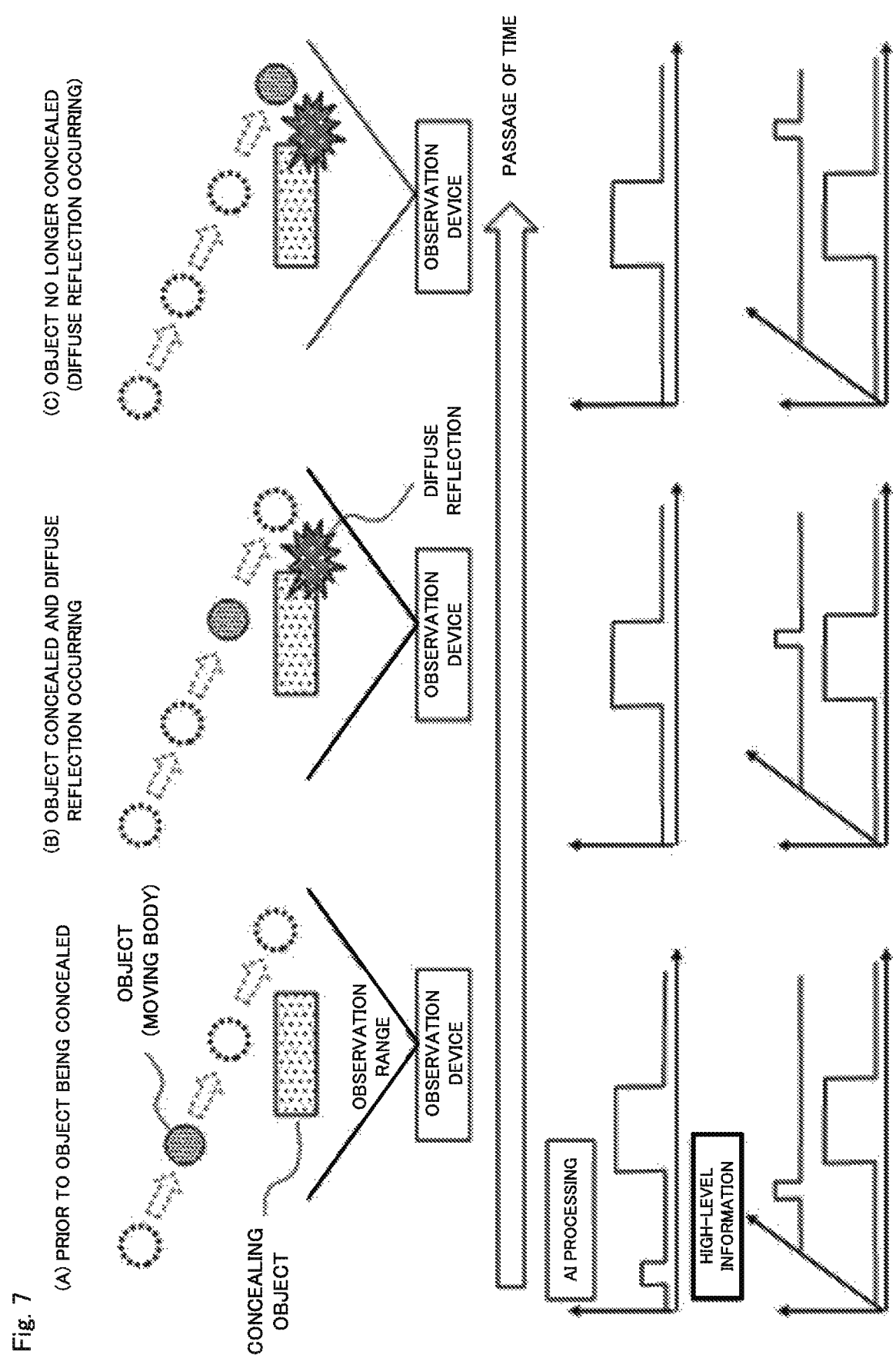
FIG. 7 is a diagram for describing an example 2.

FIG. 7 is a diagram illustrating example 2. FIG. 7 is a diagram schematically representing AI processing (second processing) for executing image recognition or moving image recognition regarding image data acquired by an observation device such as a camera. The horizontal direction in FIG. 7 indicates the passing of time. That is, the state transitions as shown in (a), (b), and (c) as time passes. Also, in the vertical direction in FIG. 7, the situations at the respective timings, the AI processing results (second processing result data) created in relation to the states, and high-level information created in relation to the situations are associated with each other. These three types of information are associated with each other, in relation to (a), (b), and (c). That is, FIG. 7 shows an example of AI processing results by the AI engine 101 and high-level information (first processing result information) estimated by the estimation unit 11. The state shown in FIG. 7 is a diagram of a plane (two-dimensional) seen from upward of the observation device.

In example 2, AI processing (second processing) is processing such as object detection, recognition, tracking, posture estimation, scene classification, object classification, or segmentation, for example. Also, the respective processing may be performed individually or may be integrally combined.

The observation device shown in FIG. 7 is, for example, an observation device such as a camera (e.g., monocular, compound eye, monochrome, RGB or depth camera, etc.), a lidar (Light Detection and Ranging), a radar (Radio Detection and Ranging), a laser, a device using ultrasonic waves or the like. The observation device may be a device that is able to capture or scan images of the image capturing range two dimensionally.

The circles in FIG. 7 use solid lines or dotted lines to show states in which the position of a moving body (object) that is targeted for recognition processing changes in the direction in which time passes. As shown in FIG. 7, the object moves in the direction of the arrows. Also, as shown by the rectangles in FIG. 7, there is a concealing object that inhibits observation by the observation device between the observation device and the object. The observation device is assumed to be unable to observe the object that is concealed by the concealing object.

The graphs in FIG. 7 conceptually represent AI processing results by the AI engine 101 and high-level information estimated by the estimation unit 501.

The graphs of AI processing that are shown in the middle section of FIG. 7 show observation values by a two-dimensional lidar (2D-lidar). The horizontal axis direction represents the horizontal position in the image capturing range. The longitudinal direction schematically represents the distance to the object observed by the observation device at a certain specific height.

Processing by the AI engine 101 is, for example, processing for detecting, recognizing or tracking an observed object. Specifically, AI processing (second processing) may be realized by combining various processing and the like that uses neural networks and Bayes filters such as particle filters and Kalman filters.

Accordingly, the AI processing result can be formally represented as the posterior probability distribution $P(x|y)$, using Bayes' theorem as a value estimated on the condition of having obtained observation data, where x is the estimated value of the position of the object and y is the observation data observed by the lidar.

Note that, for convenience in order to simplify description, the position of the object is represented two-dimensionally using a horizontal position and distance, but may be expanded to three dimensions by adding vertical plane information.

In the graphs of high-level information (first processing result information) in FIG. 7, values corresponding to horizontal positions within the observation range on the horizontal axis and distances from the observation device to the observed object at a specific height on the vertical axis are schematically represented. Furthermore, in the graphs of high-level information, a plurality of patterns are displayed by adding another axis in the depth direction.

Estimation by the estimation unit 501 can be realized by processing such as the following. The second input data that is input to the estimation unit 501 is a feature of the object and a feature of the concealing object, such as shape, color and other qualitative information, and information representing characteristics and dynamics (i.e., stationary or moving), for example. Also, as the second input data, past observation data may be acquired, or qualitative information and dynamics may be estimated from the first input data.

In the case where second input data such as described above is used, the high-level information that is estimated by the estimation unit 11 can be obtained as the result of the distinction between a stationary object and a moving object, the tendency of a moving object (e.g., whether random movement or movement that can be approximated by constant velocity or equivalent velocity movement, etc.), the range of movement, constraint conditions, or, if there is regularity in the tendency thereof, the regularity being regressed (fitted) with a function. That is, the estimation unit 11 is also able to execute processing that is in accordance with the dynamics of the target (object).

Accordingly, in the example in FIG. 7, a stationary object and a moving object are displayed separately, and the position of the moving object can be estimated using a function that approximates the movement thereof. These values can be consolidated in a new variable z and represented as the estimated distribution $P(z)$. Note that the display method shown in FIG. 7 is given as an example, and the invention is not limited thereto.

Next, FIG. 7 will be described along the temporal transition. Note that states (a) (b) (c) that are schematically represented show examples of certain characteristic points in time. Accordingly, this differs from the timing (frequency) at which observation data is actually acquired by the observation device.

First, in (a) a state before the object is concealed, the object and the concealing object are recognized, and thus display corresponding to the target and the concealing object is performed in both the graph of the AI processing and the graph of the high-level information.

In (b) a state where the object is concealed and diffuse reflection is occurring, the object moves and is concealed by the concealing object, and thus the object cannot be observed from the observation device. As a result, only the concealing object is recognized by the AI processing, and thus information representing the concealing object is displayed in the graph of the AI processing. Also, diffuse reflection caused by the material of the concealing object or the like is occurring at the right end of the concealing object (upper section of FIG. 7). It is assumed that the AI processing is unable to recognize the influence of this diffuse reflection. In this case, in the (b) state, a plurality of uncertain elements such as concealment of the object and diffuse reflection have occurred, but the AI processing is unable to eliminate the influence of these uncertain elements.

In contrast, in the graph of the high-level information in the (b) state, information corresponding to the concealing object and the object is displayed. The estimation unit 11 estimates the position of the object, in accordance with the position of the object before being hidden by the concealing object and processing that is represented by a formula representing the movement of the object, for example.

A state after the object is no longer concealed (diffuse reflection is occurring) is shown in (c). The graph in (c) represents a state in which the object moves and reappears from the shadow of the concealing object. However, since the diffuse reflection at the right end of the concealing object is ongoing, the AI processing is unable to determine the position of the object. The reason for this is that, due to the influence of a plurality of uncertain elements such as the object being concealed by the concealing object and the diffuse reflection that is produced by the concealing object, the AI processing is unable to resolve the diffuse reflection.

In this case, the AI processing is unable to obtain the position of the object that has reappeared as the observation data y, and thus, even if the estimated value P(x) of the position of the object can be correctly computed, information representing the position of the object is missing in the posterior probability distribution P(x|y) that is based on the observation data y.

In contrast, in the graph of the high-level information shown in (c), the positions of the concealing object and the object are represented, similarly to the (b) state where the object is concealed and diffuse reflection is occurring.

The specific operations of the evaluation unit 12 and the detection unit 13 will now be described.

In the case where an AI processing result (second processing result data) and high-level information (first processing result information) are acquired, the evaluation unit 12 computes the degree to which the AI processing result conflicts with (conforms to) the high-level information. For example, the evaluation unit 12 evaluates how probable the AI processing result P(x|y) is with respect to high-level information P(z), by executing processing for computing the likelihood P(z|x,y). In other words, the evaluation unit 12 is also able to compute the probability of the first processing result information being obtained in the case where the second processing result data is obtained.

First, in the (a) state before the object is concealed, the value of the likelihood P(z|x,y) is sufficiently high, since the degree to which the AI processing result P(x|y) conflicts with the high-level information P(z) is low. In this case, the detection unit 13 determines that the AI processing result is not anomalous. Since the absolute value of the likelihood is dependent on parameters such as the variance of observed noise for when calculating the likelihood, the same value is used after this point in time.

In the (b) state where the object is concealed and diffuse reflection is occurring, the degree of conflict between the AI processing result P(x|y) and the high-level information P(z) is high. Specifically, the position information of the object that is obtained in the high-level information P(z) as described above is missing in the AI processing result. The value of the likelihood P(z|x,y) is thus small compared to the case (a) before the object is concealed. As a result, the detection unit 13 determines that the AI processing result is anomalous.

The adjustment unit 502 makes adjustments such that the processing accuracy of the AI engine 101 increases if it is determined that the AI processing result is anomalous. For example, the adjustment unit 502 changes the parameters of image processing that is executed by the AI engine, in order to reduce the influence of diffuse reflection. The adjustment unit 502 may also change parameters for controlling operations of the observation device.

Even if adjustments are made in the (b) state, however, the object is concealed, and thus the processing result being anomalous cannot be resolved only through parameter adjustment.

In the (c) state after the object is no longer concealed (diffuse reflection is occurring), qualitative conflict occurs between the AI processing result P(x|y) and the high-level information P(z). Accordingly, the detection unit 13 determines that the AI processing result is anomalous. However, in the (c) state after the object is no longer concealed (diffuse reflection is occurring), the concealing of the object has been resolved. Accordingly, the anomaly of the AI processing result is resolved, due to the adjustment unit 502 adjusting the AI processing.

In this way, in the (c) state, even if concealing of the object is resolved, the position of the object cannot be detected in the AI processing due to the diffuse reflection, but it becomes possible to detect the position of the object through the adjustment by the adjustment unit 502 and the AI processing being repeated.

The system according to the second example embodiment has the information storage unit 500 capable of storing the second input data which differs from the first input data. The anomaly detection apparatus 50 estimates high-level information, using the second input data. As a result, in the example in FIG. 7, the anomaly detection apparatus 50 is able to estimate high-level information, using past observation data, qualitative information, dynamics and the like.

Furthermore, the anomaly detection apparatus 50 according to the second example embodiment has the adjustment unit 502. According to this anomaly detection apparatus 50, in the case where the AI processing result is determined to be anomalous, it is possible to recover from the anomaly of the AI processing result, even in an environment in which there are a plurality of uncertain elements, by changing the parameters of the image processing of the AI engine.

Example 3

Another example of the anomaly detection apparatus according to the second example embodiment will be described, with reference to FIG. 8.

Figure 8:
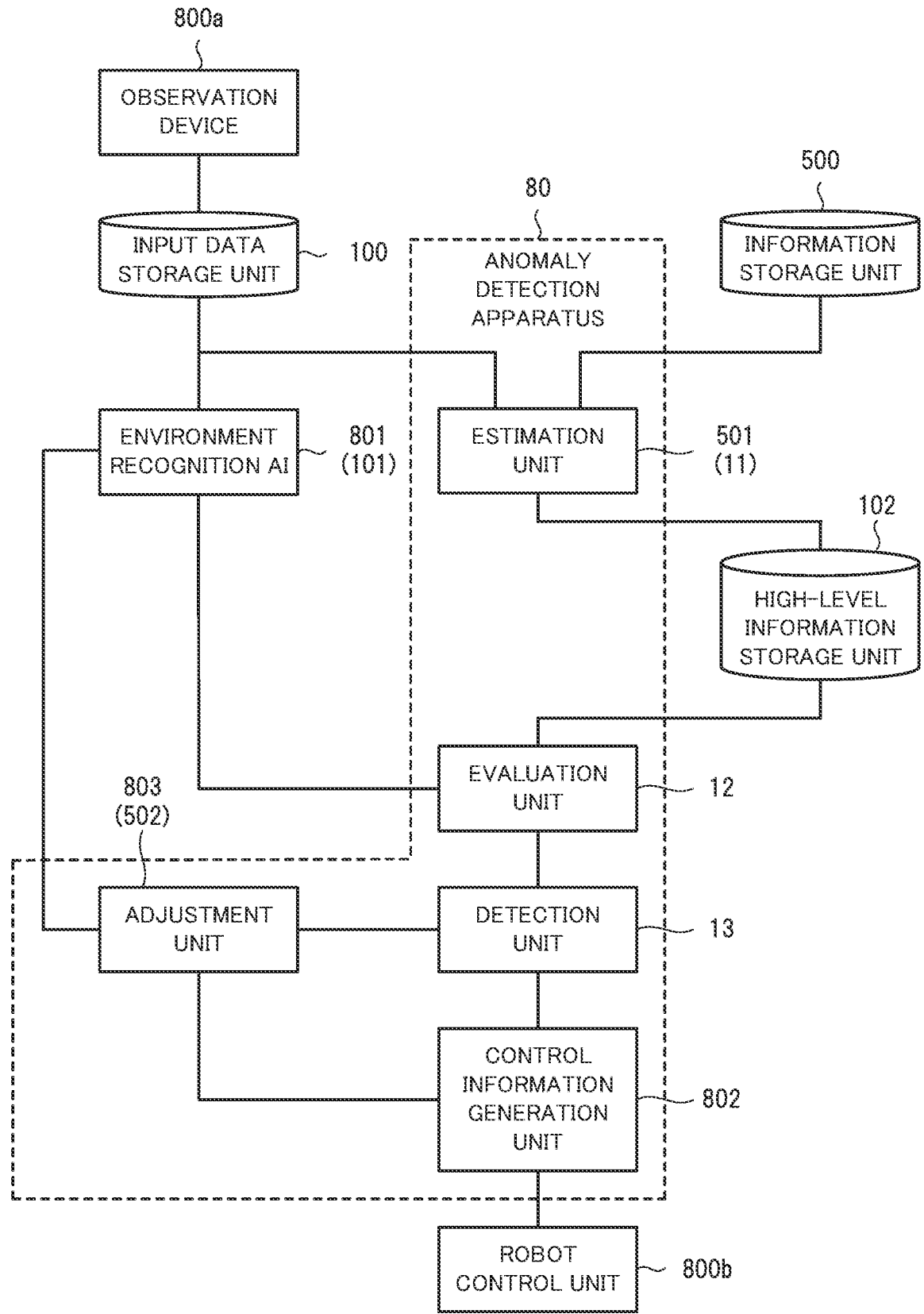
FIG. 8 is a diagram showing an example of a robot control system.

FIG. 8 is a diagram showing an example of a robot control system. The robot control system shown in FIG. 8 is a system for controlling a robot that works collaboratively in the same space as a human. The robot is a drone, a mobile robot such as an AGV (Automated Guided Vehicle), an autonomous robot or an arm-type robot, for example. The robot may also be a combination of these robots.

The robot control system shown in FIG. 8 has an anomaly detection apparatus 80, a robot having an observation device 800a and a robot control unit 800b, the input data storage unit 100, an environment recognition AI 801, the information storage unit 500 and the high-level information storage unit 102. The anomaly detection apparatus 80 has the estimation unit 501, the evaluation unit 12, the detection unit 13, a control information generation unit 802, and an adjustment unit 803. Note that the input data storage unit 100, the information storage unit 500 and the high-level information storage unit 102 are described in the first and second example embodiments, and description thereof will thus be omitted. In the case of this example, the anomaly detection apparatus 80 functions as a control device for controlling operations of a target such as a robot.

The observation device 800a is mounted on the robot and observes a predetermined observation range in the direction of travel of the robot. For example, the observation device 800a is a device that observes the environment such as a camera (monocular, compound eye, monochrome, RGB or depth camera, etc.) or a lidar. Also, the observation device 800a is communicably connected to the input data storage unit 100 of the second example embodiment. The observation device 800a stores the acquired observation data in the input data storage unit 100.

The robot control unit 800b is mounted on the robot and controls movement of the robot. In the case where the robot is a mobile robot such as an AGV, for example, the robot control unit 800b controls the movement speed, direction of movement, start, stop and the like of the mobile robot.

The environment recognition AI 801 performs required environment recognition processing such that the robot can safely execute desired operations. The environment recognition processing involves processing such as detecting, recognizing or tracking the state of the environment, the presence of obstacles, and the like in the direction of movement of the robot.

The estimation unit 501 acquires the first input data from the input data storage unit 100, and acquires the second input data from the information storage unit 500. The estimation unit 501 estimates high-level information using the first input data and second input data, and stores the estimated high-level information in the high-level information storage unit 102.

The evaluation unit 12 evaluates an AI processing result of the environment recognition AI 801 and outputs an evaluation value to the detection unit 105, similarly to the operations in the first example embodiment, using the AI processing result and the estimated high-level information.

The detection unit 13 determines whether the AI processing result is anomalous based on the evaluation value, and outputs a determination result to the control information generation unit 802.

The control information generation unit 802 generates control information for controlling the robot based on the AI processing result (second processing result data), and transmits the generated control information to the robot. Specifically, first, the control information generation unit 802 generates control information relating to the robot such as a control plan and trajectory, based on the adjustment information created by the adjustment unit 803 and the determination result by the detection unit 13. In other words, the control information generation unit 802 generates control information for controlling operations of the target, using the adjustment information. The control information generation unit 802 transmits the generated control information to the robot control unit 800b via wireless and wired communication or the like.

The adjustment unit 803 acquires the determination result by the detection unit 13, and outputs adjustment information to the environment recognition AI 801 and the control information generation unit 802. Specifically, the adjustment unit 803 generates adjustment information for adjusting parameters of the environment recognition AI processing (second processing) or conditions of the second processing, using the comparison result of the first processing result information and the second processing result data. That is, if the processing result of the environment recognition AI 801 is determined to be anomalous by the detection unit 13, the adjustment unit 803 computes adjustment information for conditions, parameters and the like of the AI processing (second processing) in the environment recognition AI 801, and feeds the adjustment information back to the environment recognition AI 801. That is, the adjustment unit 803 adjusts the environment recognition AI 801, such that the AI processing result by the environment recognition AI 801 is not anomalous. As described above, the adjustment unit 803 generates adjustment information representing conditions or the values of parameters that depend on the comparison result, in accordance with the relation between the evaluation value representing the comparison result of the first processing result information and the second processing result data and parameters of the second processing or conditions of the second processing, for example.

Also, the adjustment unit 803 outputs the adjustment information for controlling operations of the robot control unit 800b to the control information generation unit 802. Thereafter, the control information generation unit 802 generates control information for controlling operations of the robot control unit 800b, based on the adjustment information and the determination result, and transmits the generated control information to the robot control unit 800b.

In the case where a concealing object is detected in the observation data observed by the observation device 800a while the robot is moving, for example, the adjustment unit 803 generates adjustment information (e.g., information indicating which direction to move in, information indicating which direction the cause of the anomaly is in, information indicating whether uncertainty is high, etc.) required in generating a control plan or trajectory for resolving the concealed state of the object, and outputs the generated adjustment information to the environment recognition AI 801 and the control information generation unit 802.

In this way, in example 3, the adjustment unit 803 is able to make adjustments such that the AI processing result by the environment recognition AI 801 is normal, using the adjustment information generated based on the determination result, and the occurrence of anomalies in the robot control unit 800b can thus be suppressed.

Third Example Embodiment

Figure 9:
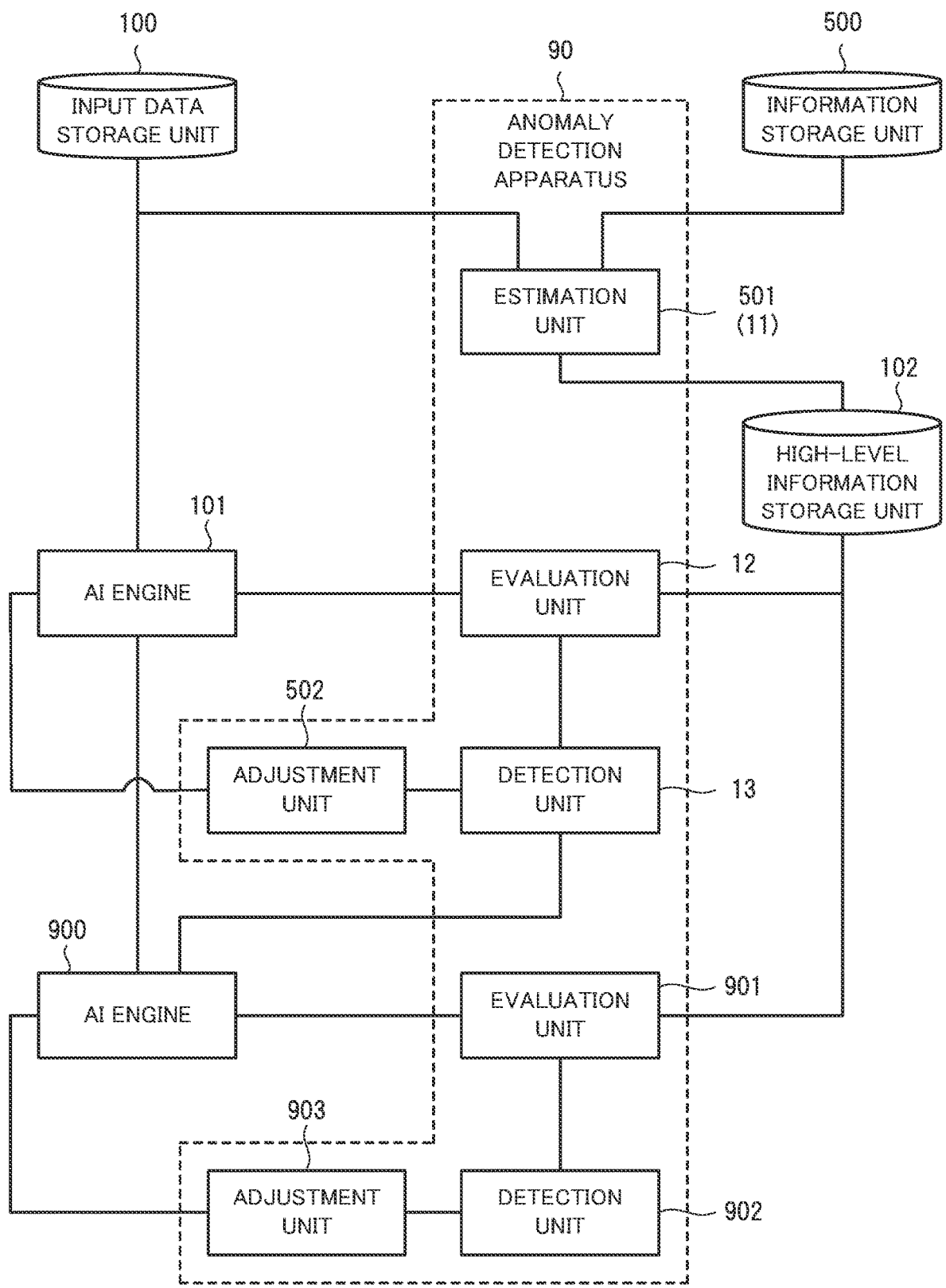
FIG. 9 is a diagram showing an example of a system having an anomaly detection apparatus.

Hereinafter, a third example embodiment will be described, with reference to FIGS. 9 to 11.
[System Configuration]
The configuration of an anomaly detection apparatus 90 in the third example embodiment will be specifically described using FIG. 9. FIG. 9 is a diagram showing an example of a system having the anomaly detection apparatus.

As shown in FIG. 9, the system in the third example embodiment has the anomaly detection apparatus 90, the input data storage unit 100, the information storage unit 500, the AI engine 101, an AI engine 900, and the high-level information storage unit 102. Note that the input data storage unit 100, the information storage unit 500, the AI engine 101 and the high-level information storage unit 102 are described in the first and second example embodiments, and description thereof will thus be omitted.

Furthermore, the anomaly detection apparatus 90 has the estimation unit 501 corresponding to the estimation unit 11 of the first example embodiment, the evaluation unit 12, the detection unit 13, the adjustment unit 502, an evaluation unit 901, a detection unit 902, and an adjustment unit 903. Note that the evaluation unit 12 and the detection unit 13 are described in the first example embodiment, and description thereof will thus be omitted.

The anomaly detection apparatus 90 determines whether processing results of the AI engines are anomalous, and adjusts operations of the AI engines using the determination results. This enables operations to be adjusted such that the AI processing results will also not be anomalous in a system having a plurality of AI engines.

The AI engine 900 inputs AI processing results from the AI engine 101 and inputs determination results for the AI processing results from the detection unit 13. The AI engine 900 executes AI processing that differs from the AI processing by the AI engine 101. Specifically, first, the AI engine 900 acquires an AI processing result by the AI engine 101. Also, the AI engine 900 acquires a determination result for the AI processing result by the AI engine 101 from the detection unit 13. The AI engine 900 executes AI processing that differs from the AI processing in the AI engine 101, using the acquired AI processing result and determination result for the AI processing result.

The evaluation unit 901 evaluates the processing result for the AI processing by the AI engine 900 using high-level information that is stored in the high-level information storage unit 102. Specifically, first, the evaluation unit 901 acquires an AI processing result for the AI processing by the AI engine 900 and high-level information that is stored in the high-level information storage unit 102. The evaluation unit 901 derives an evaluation value for the acquired AI processing result, using the acquired AI processing result and high-level information. The evaluation unit 901 outputs the derived evaluation value to the detection unit 902. Note that the evaluation value may be derived using probability distributions described in the first example embodiment, or the like.

The detection unit 902 determines whether the AI processing result for AI processing by the AI engine 900 is anomalous, using the evaluation value. Specifically, the detection unit 902 acquires the evaluation value from the evaluation unit 901. The detection unit 902 determines whether the AI processing result is anomalous, according to the acquired evaluation value.

The detection unit 902 compares an evaluation value such as likelihood, information amount or distance described above with a predetermined threshold value for determining whether the AI processing result is anomalous, and determines whether the AI processing result is anomalous according to the comparison result, for example. The predetermined threshold value may be determined by testing or simulation, for example.

The adjustment unit 903 acquires the determination result by the detection unit 902, generates adjustment information for adjusting the AI engine 900 based on the determination result, and outputs the generated adjustment information. Specifically, in the case where the AI processing result is determined to be anomalous by the detection unit 902, the adjustment unit 903 computes adjustment information such as conditions or parameters of the AI processing in the AI engine 900, and feeds the computed adjustment information back to the AI engine 900. This enables the adjustment unit 903 to adjust operations of the AI engine 900, such that the AI processing result by the AI engine 900 is not determined to be anomalous.

The adjustment unit 903 may compute adjustment information in accordance with a general parameter update technique or the like. The parameter update technique is the gradient method, for example. The gradient method represents the relation between the evaluation value computed by the detection unit 902 and parameters of the AI processing by the AI engine 900 as an evaluation function, and includes processing for estimating adjustment information for the parameters, based on differential values of the evaluation function with respect to the parameters.

Thereafter, the AI engine 900 executes AI processing in accordance with the parameters indicated by the adjustment information. The detection unit 902 determines whether the AI processing result relating to the AI processing is anomalous. The above-described processing is then executed repeatedly until an anomaly is no longer detected. According to this anomaly detection apparatus 90, the AI processing result can be normalized (or kept normal).

[Apparatus Operations]

Next, operations of the anomaly detection apparatus 90 in the third example embodiment will be described using FIG. 10. FIG. 10 is a diagram showing an example of operations of the anomaly detection apparatus 90. In the following description, FIG. 9 will be referred to as appropriate. Also, in the third example embodiment, the anomaly detection method is implemented by operating the anomaly detection apparatus 90. Therefore, description of the anomaly detection method in the third example embodiment is replaced by the following description of the operations of the anomaly detection apparatus.

Processing for determining whether the AI processing result by the AI engine 101 is anomalous and processing for adjusting operations of the AI engine 101, in the anomaly detection apparatus 90 according to the third example embodiment, are described in the second example embodiment, and description of this processing will thus be omitted.

Subsequently, processing for determining whether the AI processing result by the AI engine 900 is anomalous and processing for adjusting operations of the AI engine 900, in the anomaly detection apparatus 90 according to the third example embodiment, will be described.

Figure 10:
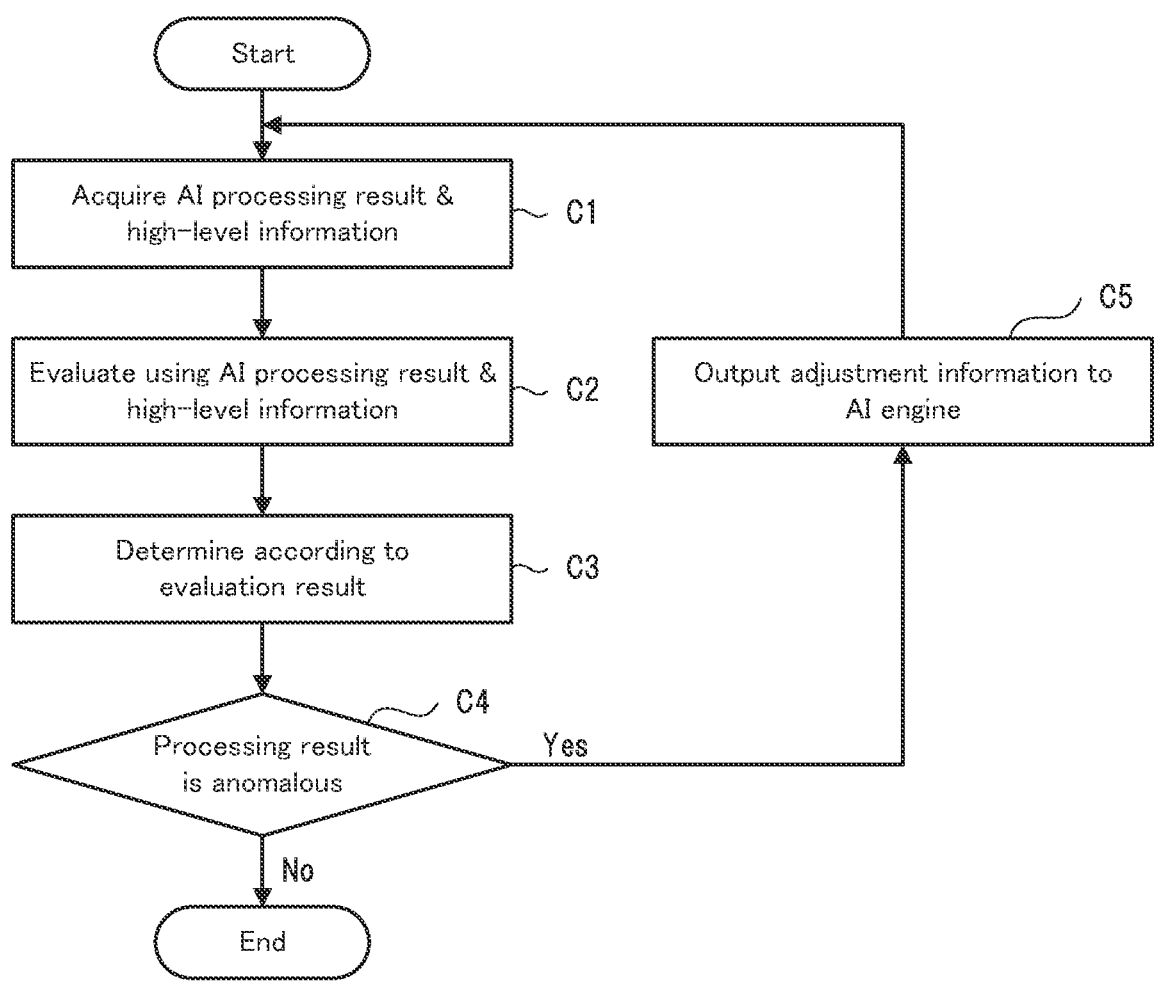
FIG. 10 is a diagram showing an example of operations of the anomaly detection apparatus.

As shown in FIG. 10, the evaluation unit 901 acquires an AI processing result by the AI engine 900 and high-level information that is stored in the high-level information storage unit 102 (step C1). The AI processing result by the AI engine 900 is a processing result obtained by AI processing in the AI engine 900, using the AI processing result by the AI engine 101 and the determination result for the AI processing result by the AI engine 101.

The evaluation unit 901 evaluates the AI processing result by the AI engine 900, using high-level information in the high-level information storage unit 102 (step C2). Specifically, in step C2, the evaluation unit 901 derives an evaluation value by computing the degree to which the acquired AI processing result conforms to (or conflicts with) the acquired high-level information. The evaluation unit 901 outputs the evaluation value to the detection unit 902.

The detection unit 902 determines whether the AI processing result by the AI engine 900 is anomalous, using the evaluation value (step C3). Specifically, in step C3, the detection unit 902 acquires an evaluation value from the evaluation unit 901. The detection unit 902 compares the acquired evaluation value with a predetermined criterion for determining whether the AI processing result is anomalous, and determines whether the processing result is anomalous according to the comparison result.

In step C3, if it is determined that the AI processing result by the AI engine 900 is anomalous (step C4: Yes), the processing of step C5 is executed. Note that if it is determined that the AI processing result by the AI engine 900 is not anomalous (step C4: No), the processing shown in steps C1 to C5 is executed.

If an anomaly is detected in step C4, the adjustment unit 903, in step C5, acquires a determination result computed by the detection unit 902 and outputs adjustment information to the AI engine 900.

Specifically, if the detection unit 902 determines that the AI processing result by the AI engine 900 is anomalous, the adjustment unit 903, in step C5, computes adjustment information such as conditions or parameters of the AI processing in the AI engine 900, based on the relation between the evaluation value and parameters of the AI processing, for example. The adjustment unit 903 feeds the computed adjustment information back to the AI engine 900. This enables the anomaly detection apparatus 90 to make adjustments such that the AI processing result by the AI engine 900 is not determined to be anomalous.

Effects of Third Example Embodiment

In the third example embodiment, AI processing results are evaluated using high-level information obtained by processing performed on input data in accordance with predetermined criteria, and anomalies of AI processing results can thus be detected.

Accordingly, even in (1) an environment where it is difficult to eliminate various uncertainties in the physical world and (2) an environment in which there are unexperienced events that the AI has never experienced or learned, anomalies of AI processing results can be detected, and practical processing results can thus be obtained.

Also, according to the third example embodiment, by using the second input data from the information storage unit 500, high-level information can be estimated more accurately, using data that differs from the first input data that is set for the AI engine 101 and the AI engine 900.

Furthermore, the third example embodiment can be applied to a configuration having a plurality of AI engines, enabling anomalies of the respective AI processing results to be independently detected, based on common high-level information, and AI processing by a downstream AI engine to be performed in the case where there is no anomaly.

[Program]

A program in the third example embodiment need only be a program that causes a computer to execute the steps shown in FIG. 6 (processing of determining whether the processing result of the AI engine 101 is anomalous and processing for adjusting the AI engine 101) and steps C1 to C5 shown in FIG. 10. The anomaly detection apparatus and the anomaly detection method in the third example embodiment can be realized by this program being installed on a computer and executed.

In this case, a processor of the computer performs processing while functioning as the estimation unit 501, the evaluation unit 12, the detection unit 13, the adjustment unit 502, the evaluation unit 901, the detection unit 902 and the adjustment unit 903.

The program in the third example embodiment may also be executed by a computer system constructed from a plurality of computers. In this case, for example, the computers may each function as one of the estimation unit 501, the evaluation unit 12, the detection unit 13, the adjustment unit 502, the evaluation unit 901, the detection unit 902 and the adjustment unit 903.

Example 4

An example of the anomaly detection apparatus 90 of the third example embodiment will be described.

In example 4, the AI engine 101 executes at least one of AI processing relating to recognition of image data captured by an observation device such as a camera and AI processing relating to recognition of moving image data captured by the observation device. In the case where an anomaly is not detected by the detection unit 13, an AI processing result relating to recognition is input to the AI engine 900.

Example 4 will be described with reference to an example of control of an autonomous vehicle, an autonomous robot or the like, such as self-position estimation, map generation, motion planning and model prediction control, for example, as AI processing by the AI engine 900.

The AI engine 900 receives input of a recognition result in a state where there is no anomaly and outputs an AI processing result. The evaluation unit 901 compares the AI processing result with high-level information. In example 4, the information storage unit 500 stores information (e.g., qualitative information, dynamics, etc. of the object) related to recognition processing by the AI engine 101 and information related to the control processing by the AI engine 900. Information related to control processing by the AI engine 900 is information such as control objective, constraints and priority, for example.

The estimation unit 501 (11) estimates high-level information, using the first input data and second input data, and stores the estimated high-level information in the high-level information storage unit 102. The evaluation unit 901 computes the degree to which the AI processing result by the AI engine 900 conforms to (or conflicts with) high-level information that is stored in the high-level information storage unit 102. This degree represents an evaluation value for determining whether AI processing results by the AI engine 900 are anomalous. The detection unit 902 acquires an evaluation value, compares the acquired evaluation value with a predetermined criterion for determining an anomaly, and determines whether the AI processing result is anomalous according to the comparison result.

The case where the AI processing result by the AI engine 900 is anomalous is, for example, the case where a control signal that does not satisfy the planned trajectory or constraint conditions is output, or where an action is not suitable for the control objective or the environment even though necessary conditions for the action are satisfied.

In the case where the AI processing result is determined to be anomalous, the adjustment unit 903 adjusts operations of the AI engine 900, such that the AI processing result by the AI engine 900 is not determined to be anomalous. The adjustment unit 903 outputs a parameter for adjusting control processing by the AI engine 900, for example. The parameter is, for example, a control constraint condition or a parameter relating to priority.

In example 4, the case is described where control processing is performed after recognition processing, but recognition processing may be performed after control processing or replaced by other AI processing. Furthermore, in example 4, processing in the anomaly detection apparatus 90 is described with reference to a configuration example realized by two hierarchical AI engines, but the number of AI engines need not necessarily be two. That is, the system may have a configuration in which three or more AI engines are combined.

Example 5

An example of the anomaly detection apparatus 90 of the third example embodiment will be described.

In example 5, a system for controlling an autonomous robot that works autonomously in a space where the autonomous robot works collaboratively with a human will be described. FIG. 11 is a diagram showing an example of the autonomous robot control system. The autonomous robot is a humanoid robot or a collaborative robot, for example.

Figure 11:
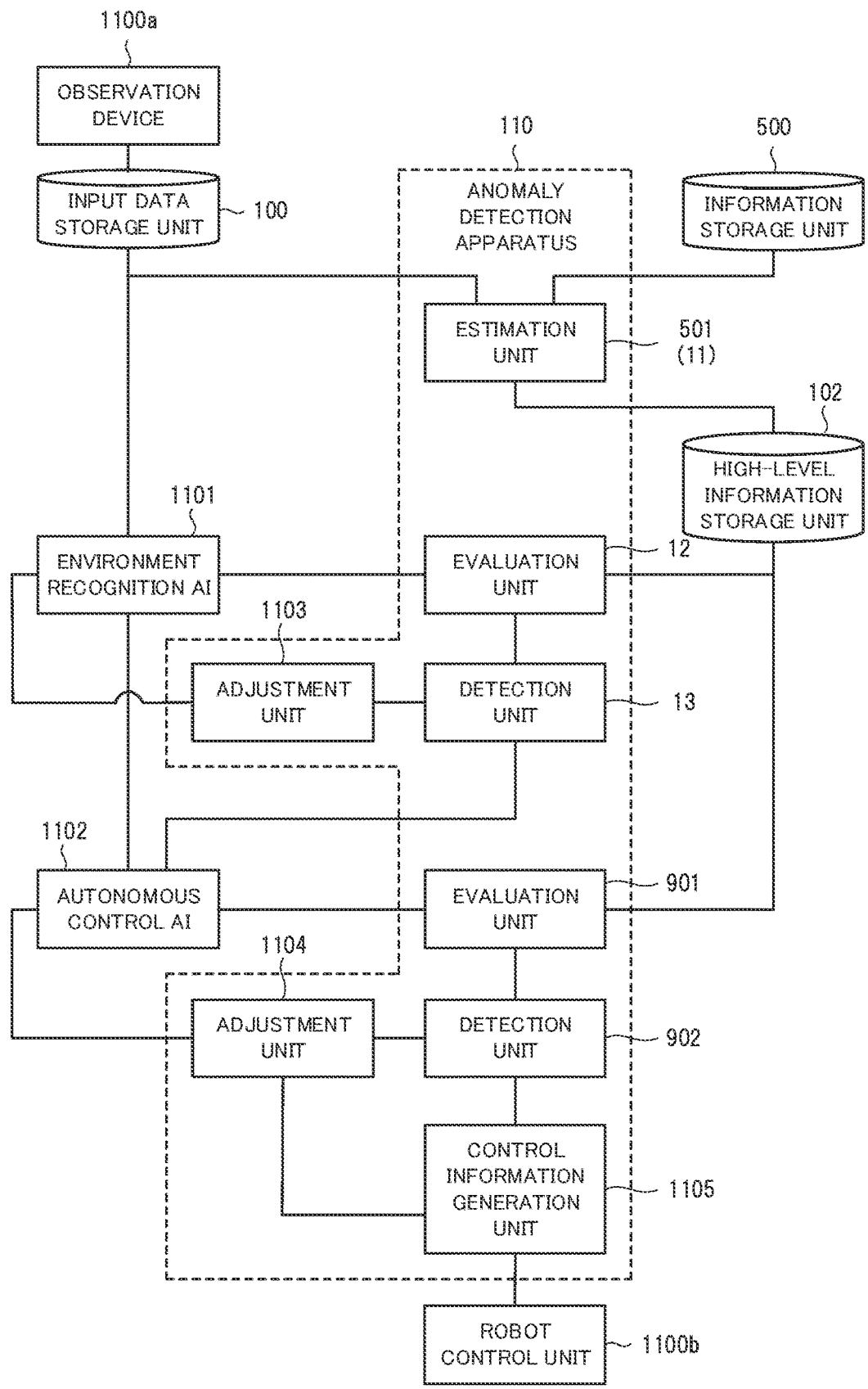
FIG. 11 is a diagram showing an example of an autonomous robot control system.

The autonomous robot control system shown in FIG. 11 has an anomaly detection apparatus 110, an autonomous robot having an observation device 1100a and a robot control unit 1100b, the input data storage unit 100, an environment recognition AI 1101, an autonomous control AI 1102, the information storage unit 500 and the high-level information storage unit 102. The anomaly detection apparatus 110 has the estimation unit 501, the evaluation unit 12, the detection unit 13, an adjustment unit 1103, the evaluation unit 901, the detection unit 902, an adjustment unit 1104 and a control information generation unit 1105. In this case, the anomaly detection apparatus 110 functions as a control device for controlling operations of a target such as an autonomous robot.

Note that the input data storage unit 100, the information storage unit 500 and the high-level information storage unit 102 are described in the first example embodiment, and description thereof will thus be omitted. The evaluation unit 12, the detection unit 13, the evaluation unit 901 and the detection unit 902 are described in the first and third example embodiments, and description thereof will thus be omitted.

The observation device 1100a is mounted on the autonomous robot and is a device for observing a predetermined observation range (in the direction of travel of the autonomous robot). For example, the observation device 1100a is a device for observing the environment such as a camera (monocular, compound eye, monochrome, RGB or depth camera, etc.) or a lidar. Also, the observation device 1100a is communicably connected to the input data storage unit 100 of the third example embodiment. The observation device 1100a stores acquired observation data in the input data storage unit 100.

The robot control unit 1100b is mounted on the autonomous robot and controls movement of the autonomous robot. For example, the robot control unit 1100b controls the movement speed, direction of movement, start, stop and the like of the autonomous robot.

The environment recognition AI 1101 executes environment recognition processing for recognizing the environment in which the autonomous robot is located, such that the autonomous robot can safely execute target operations. The environment recognition processing involves processing such as detecting, recognizing or tracking the state of the environment and the presence of obstacles and the like in the direction of movement, for example.

The autonomous control AI 1102 receives input of an AI processing result (in this example, recognition result) by the environment recognition AI 1101. The autonomous control AI 1102 receives input of a determination result relating to the AI processing result from the detection unit 13. The autonomous control AI 1102 generates an autonomous control plan, based on the input AI processing result and determination result. The processing of the autonomous control AI 1102 involves generating control input values of a path plan, operation plan or the like for executing tasks such as moving the autonomous robot and pick and place (picking up and placing things), based on the AI processing result which has been resolved of being anomalous. The control input values are represented in time series.

If it is determined that the AI processing result by the environment recognition AI 1101 is anomalous, the adjustment unit 1103 executes processing such as adjusting the values of parameters of the AI processing, based on the evaluation value relating to the AI processing result. That is, the adjustment unit 1103 adjusts operations of the environment recognition AI 1101 such that the anomaly of the AI processing result is resolved.

If it is determined that the AI processing result by the autonomous control AI 1102 is anomalous, the adjustment unit 1104 adjusts operations of the autonomous control AI 1102 such that the anomaly of the AI processing result is resolved. The adjustment unit 1104 outputs adjustment information for controlling operations of the autonomous robot to the control information generation unit 1105.

The control information generation unit 1105 acquires the adjustment information, generates control information for controlling the autonomous robot based on the acquired adjustment information, and transmits the generated control information to the robot. Specifically, the control information generation unit 1105 generates control information for controlling operations of the autonomous robot such as a control plan or a trajectory, based on the adjustment information and the determination result. The control information generation unit 1105 transmits the generated control information to the robot control unit 1100b via a communication network such as a wireless and wired communication network.

Example 6

In example 6, processing of the anomaly detection apparatus 110 will be described with reference to an example in which the system has the plurality of AI engines. In the third example embodiment, anomalies of the respective AI engines can also be independently detected, based on high-level information that is common between the plurality of AI engines.

The processing of the anomaly detection apparatus 110 will be described with reference to an example in which the task given to the autonomous robot is picking up objects (picking up things).

The high-level information that is in common is assumed to be information indicating that the object is moving periodically in a period T at a constant velocity v, which is estimated by the estimation unit 501 from the observation result by the observation device 1100a. This indicates work involving picking up components that are circulating on a belt conveyor or the like, for example.

Also, a situation is assumed in which, as a result of an obstacle or the like entering between the observation device 1100a and the object, the object is periodically concealed, and there is a timing at which the object is not recognized by the environment recognition AI 1101.

In such a situation, the detection unit 13 determines that the AI processing result at the timing at which the object is not recognized is anomalous. However, because the anomaly detection apparatus 110 estimates that the object is moving periodically, anomalies such as losing sight of the object or misrecognizing the obstacle as the object can be avoided based on the estimation result.

The autonomous control AI 1102 inputs position information of the object and position information of the obstacle, and generates an operation plan for picking up the object. However, the environment recognition AI 1101 has not recognized the object. The autonomous control AI 1102 thus creates an operation plan for approaching the object at a timing at which the position information of the object is not acquired. As a result, the detection unit 902 determines that the processing result by the autonomous control AI 1102 is anomalous. Because the high-level information indicates that the object is present, the detection unit 902 determines that the degree of conflict occurring between the processing result and the high-level information satisfies a predetermined criterion for judging that there is an anomaly, and determines that the processing result is anomalous.

The adjustment unit 903 predicts where the object will be positioned at the timing at which the position information of the object is not acquired, based on the velocity v of the object indicated by the high-level information, and generates adjustment information that serves as the basis for creating an operation plan relating to the autonomous robot, based on the predicted position, for example. Thereafter, the control information generation unit 1105 generates control information based on the generated adjustment information, and transmits the generated control information to the robot control unit 1100b.

The adjustment unit 903 may generate adjustment information for moving the autonomous robot such that the object is not concealed in the next period, based on high-level information indicating that the object is moving in the period T. That is, the adjustment unit 903 may generate adjustment information for moving the autonomous robot such that the AI processing results by the environment recognition AI 1101 are not detected as anomalous.

Note that, in example 6, in a system that combines different AI engines called an environment recognition AI and an autonomous control AI, the anomaly detection apparatus 110 according to this example embodiment enables tasks to be executed even in the case where there is uncertainty in the environment, due to anomaly detection that is based on common high-level information and loop processing for resolving anomalies.

Fourth Example Embodiment

Figure 12:
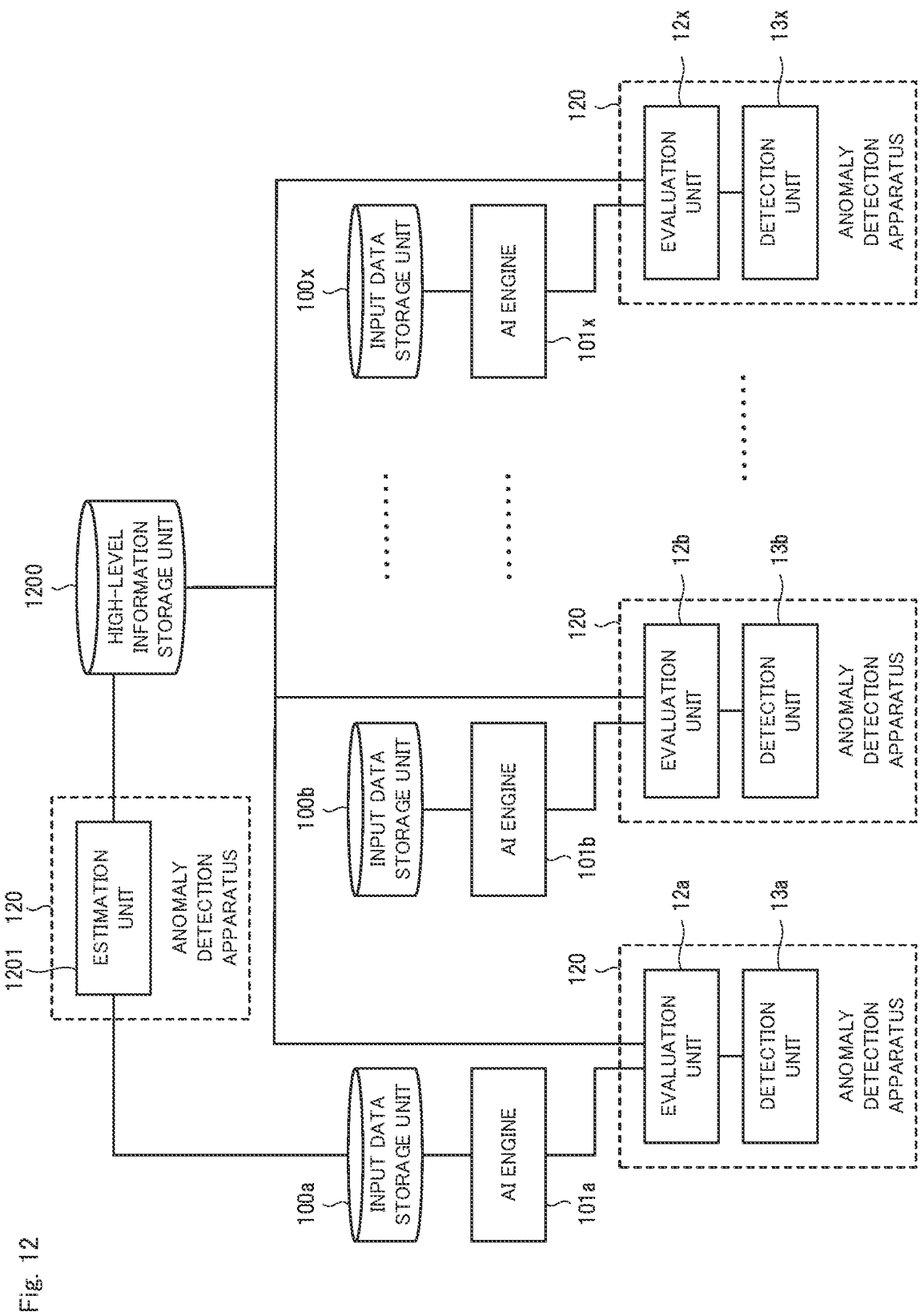
FIG. 12 is a diagram showing an example of a system having an anomaly detection apparatus.

Hereinafter, a fourth example embodiment will be described, with reference to FIGS. 12 and 13.
[System Configuration]
The configuration of an anomaly detection apparatus 120 in a fourth example embodiment will be specifically described using FIG. 12. FIG. 12 is a diagram showing an example of a system having the anomaly detection apparatus 120.

As shown in FIG. 12, the system in the fourth example embodiment has a plurality of input data storage units 100 (100a, 100b, ..., 100x), a plurality of AI engines 101 (101a, 101b, ..., 101x) and a high-level information storage unit 1200. Also, the anomaly detection apparatus 120 has an estimation unit 1201, a plurality of evaluation units 12 (12a, 12b, 12x) and a plurality of detection units 13 (13a, 13b, ..., 13x). Note that a to x are reference signs given for convenience, and do not represent specific numbers of units.

The evaluation units 12a, 12b, ..., 12x respectively derive, for the AI engines 101a, 101b, ..., 101x, evaluation values for the AI processing results by the AI engines 101a, 101b, ..., 101x, using the respective processing results of the AI engines and high-level information. Thereafter, the detection units 13a, 13b, ..., 13x respectively outputs determination results based on respective evaluation values and a predetermined criterion for determining an anomaly.

The input data storage units 100a, 100b, ..., 100x respectively store input data to be input to the corresponding AI engine. The input data storage units 100a, 100b, ..., 100x may be provided anywhere within the system shown in FIG. 12. For example, the anomaly detection apparatus 10 may include the input data storage units. In FIG. 12, wiring connecting the estimation unit 1201 and the input data storage units 100b, ..., 100x is not illustrated for reasons of convenience.

The AI engines 101a, 101b, ..., 101x respectively acquire input data from the corresponding input data storage unit 100 and execute AI processing based on the acquired input data. The AI processing respectively executed by the AI engines 101a, 101b, ..., 101x may be partly the same processing, or may all be different processing. Furthermore, at least two of the AI engines 101a, 101b, ..., 101x may execute processing in parallel.

The estimation unit 1201 acquires input data from the input data storage units 100a, 100b, ..., 100x, estimates high-level information based on the input data, and stores the estimated high-level information in the high-level information storage unit 1200. Also, the high-level information storage unit 1200 may be provided anywhere within the system shown in FIG. 12. For example, the high-level information storage unit 1200 may be provided in the anomaly detection apparatus 120.

The anomaly detection apparatus 120 will now be specifically described.

The estimation unit 1201 corresponds to the estimation unit 11 of the first example embodiment, and estimates high-level information (first processing result information), using input data respectively acquired from the input data storage units 100a, 100b, ..., 100x. High-level information is information obtained by processing (e.g., categorization, inference, etc.) being performed on the input data with a predetermined criterion.

The evaluation units 12a, 12b, ..., 12x respectively acquire processing results (second processing result data) from the corresponding AI engines 101a, 101b, ..., 101x. Also, the evaluation units 12a, 12b, ..., 12x each acquire high-level information from the high-level information storage unit 1200, and compute the degree to which the processing result conforms to (conflicts with) the high-level information. That is, the evaluation units 12a, 12b, ..., 12x respectively generate an evaluation value for the processing result. The evaluation units 12a, 12b, ..., 12x respectively output the evaluation values to the detection units 13a, 13b, ..., 13x.

The detection units 13a, 13b, ..., 13x respectively acquire the evaluation values from the corresponding evaluation units 12a, 12b, ..., 12x. The detection units 13a, 13b, and 13x respectively compare the evaluation value with a predetermined criterion for determining an anomaly, and determine whether the processing result is anomalous according to the comparison result. In other words, the detection units 13a, 13b, ..., 13x respectively determine whether the processing result is anomalous, according to the acquired evaluation value. Due to this processing, the detection units 13a, 13b, ..., 13x compare the respective processing results (second processing result data) with high-level information (first processing result information). In other words, in the case of this example, an evaluation unit is provided for every object, and all the evaluation units evaluate respective second processing result data, using the first processing result information estimated by the estimation unit 1201.

The detection units 13a, 13b, . . . , 13x respectively compare an evaluation value such as likelihood, information amount and distance described above with a predetermined threshold value, and determine whether the AI processing result is anomalous according to the comparison result, for example. The threshold value may be determined by testing or simulation, for example.

Note that, in the fourth example embodiment, the estimation unit 1201, the evaluation units 12a, 12b, . . . , 12x and the detection units 13a, 13b, . . . , 13x are included in the anomaly detection apparatus 120, but are not limited to the configuration of FIG. 12.

For example, an apparatus z (where z is a to x) may have an input data storage unit 100z, an AI engine 101z, an evaluation unit 12z, and a detection unit 13z.

Effects of Fourth Example Embodiment

In the fourth example embodiment, AI processing results can be evaluated based on high-level information obtained by performing processing on input data in accordance with a predetermined criterion, and anomalies of the AI processing results can thus be accurately detected.

Accordingly, even in (1) an environment where it is difficult to eliminate various uncertainties in the physical world and (2) an environment in which there are unexperienced events that the AI has never experienced or learned, anomalies of AI processing results can be detected, and practical processing results can thus be obtained.

Furthermore, in the fourth example embodiment, the plurality of evaluation units 12a, 12b, . . . , 12x are able to share high-level information, and anomalies of the processing results of the AI engines can thus be determined, based on common high-level information.

Also, high-level information does not need to be estimated for every one of the AI engines 101a, 101b, . . . , 101x, and the calculation resources (calculation load) required in processing for estimating high-level information can thus be reduced.

Furthermore, even if input data required in estimating high-level information is not obtained by all the AI engines 101a, 101b, . . . , 101x, as long as input data is acquired from at least one input data storage unit 100, high-level information can be estimated based on the input data, and the AI engines are thus able to share high-level information.

Also, each anomaly detection apparatus 120 may further have a function of adjusting the processing result of the AI engine. That is, each AI engine may have the adjustment unit described above in the second and third example embodiments. Also, a configuration provided with a plurality of AI engines may be adopted.

Example 7

An example of the anomaly detection apparatus according to the fourth example embodiment will be described.

Figure 13:
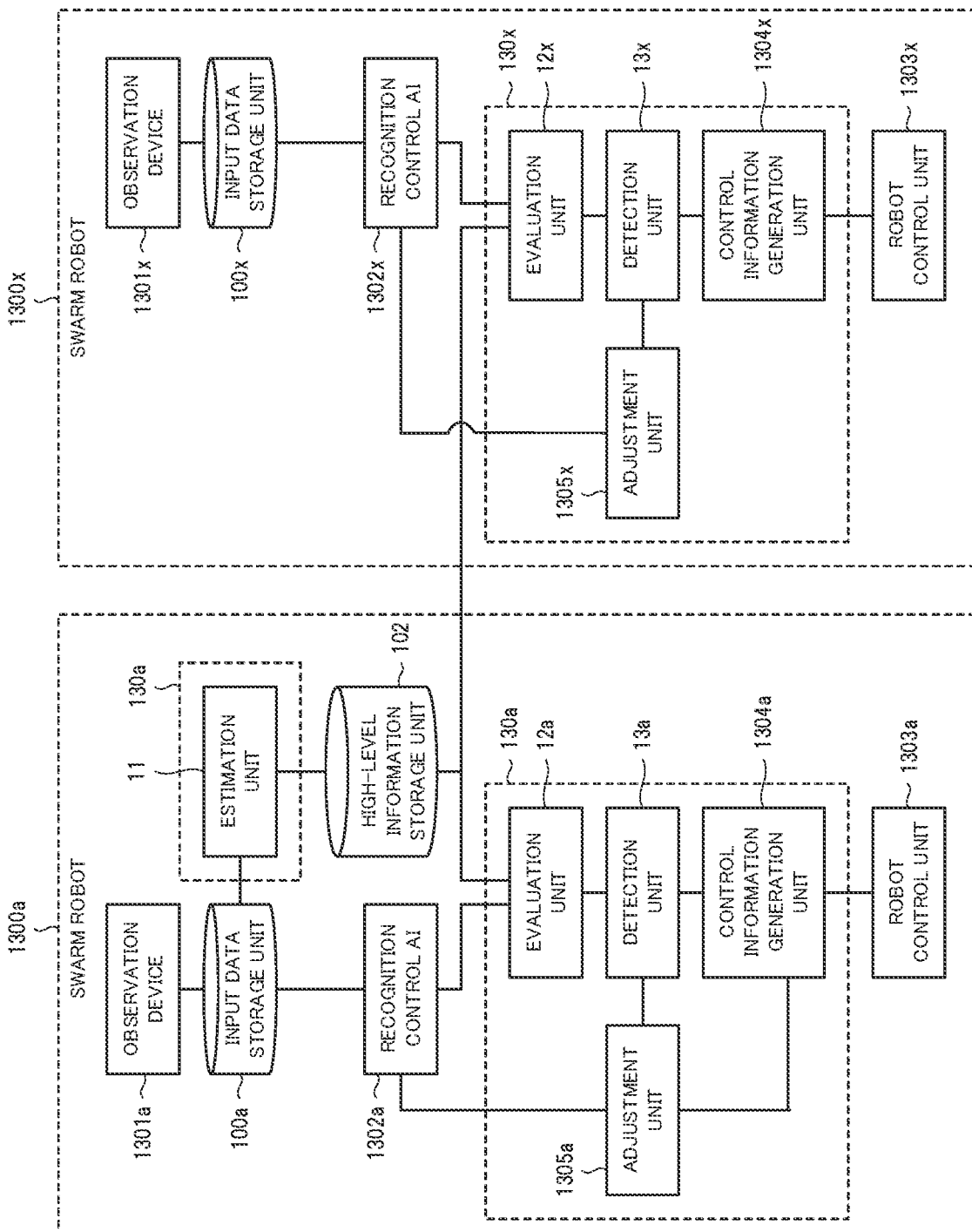
FIG. 13 is a diagram showing an example of a swarm robot control system.

FIG. 13 is a block diagram showing an example of a swarm robot control system. The swarm robot control system has a plurality of swarm robots 1300 (1300a, 1300x) (where x is an integer of 2 or more). In the swarm robot control system, at least some of the robots execute tasks while coordinating with each other.

The swarm robot control system is a swarm robotics system realized in accordance with a processing technique such as swarm intelligence, for example. The swarm robot control system is, however, not limited to the example of a swarm robotics system.

Each swarm robot has an observation device, an input data storage unit, a recognition control AI, an anomaly detection apparatus and a robot control unit. The swarm robots may also have a high-level information storage unit. For example, the swarm robot 1300a has an image capturing apparatus 1301a, an input data storage unit 102a, a recognition control AI 1302a, a robot control unit 1303a, an anomaly detection apparatus 130a and the high-level information storage unit 102. The swarm robot 1300x has an image capturing apparatus 1301x, an input data storage unit 102x, a recognition control AI 1302x, a robot control unit 1303x and an anomaly detection apparatus 130x.

The anomaly detection apparatus 130a has the estimation unit 11, an evaluation unit 12a, a detection unit 13a, a control information generation unit 1304a and an adjustment unit 1305a. The anomaly detection apparatus 130x has an evaluation unit 12x, a detection unit 13x, a control information generation unit 1304x and an adjustment unit 1305x. In this case, the anomaly detection apparatus 130a and the anomaly detection apparatus 130x function as a control device for controlling operations of a target such as a swarm robot.

Note that, in the example in FIG. 13, the swarm robot 1300a has an input data storage unit 100a, the estimation unit 11, and the high-level information storage unit 102. However, an information processing apparatus, server computer or the like separate from the swarm robot may have the input data storage unit 100a, the estimation unit 11 and the high-level information storage unit 102.

The swarm robots 1300a and 1300x respectively have the image capturing apparatus 1301a and the image capturing apparatus 1301x. The image capturing apparatus 1301a and the image capturing apparatus 1301x are devices for observing a predetermined observation range (in the direction of travel of the robot on which the apparatus is mounted). The image capturing apparatuses 1301a and 1301x are devices for observing the environment such as a camera (monocular, compound eye, monochrome, RGB or depth camera, etc.) or a lidar, for example. The image capturing apparatuses 1301a and 1301x may be realized by combining these devices.

The robot control units 1303a and 1303x respectively control operations (e.g., movement) of the swarm robots 1300a and 1300x. The robot control units 1303a and 1303x respectively control the movement speed, direction of movement, start, stop and the like of the swarm robots 1300a and 1300x, for example.

The recognition control AI 1302a and 1302x are AI engines that execute AI processing such as environment recognition, autonomous control, or combined processing thereof.

The estimation unit 11 acquires input data from the input data storage unit 100a, estimates high-level information using the acquired input data, and stores the estimated high-level information in the high-level information storage unit 102.

The evaluation unit 12a evaluates an AI processing result by the recognition control AI 1302a, by computing the degree to which the AI processing result conforms to (conflicts with) the estimated high-level information, using the AI processing result and the high-level information. The evaluation unit 12a outputs an evaluation value thereof to the detection unit 13a. The evaluation unit 12x evaluates an AI processing result by the recognition control AI 1302x, using the AI processing result and the estimated high-level information, with similar processing, and outputs an evaluation value thereof to the detection unit 13x.

The detection unit 13a compares a criterion for determining an anomaly with the evaluation value relating to the AI processing result by the recognition control AI 1302a, and determines whether the processing result is anomalous according to the comparison result. The detection unit 13a outputs the determination result to the control information generation unit 1304a and the adjustment unit 1305a. The detection unit 13x determines whether the AI processing result is anomalous, based on the evaluation value relating to the AI processing result by the recognition control AI 1302x, and outputs the determination result to the control information generation unit 1304x and the adjustment unit 1305x.

The control information generation unit 1304a generates control information for controlling operations of the swarm robot 1300a based on adjustment information (described later) relating to the AI processing result by the recognition control AI 1302a, and outputs the generated control information to the robot control unit 1303a. Similarly, the control information generation unit 1304x generates control information for controlling the swarm robot 1300x based on adjustment information (described later) relating to the AI processing result by recognition control AI 1302x, and outputs the generated control information to the robot control unit 1303x.

The adjustment unit 1305a acquires the determination result for the AI processing result by the recognition control AI 1302a. The adjustment unit 1305a computes the value of a control parameter for adjusting operations of the swarm robot 1300a, based on the relation between the acquired determination result and the control parameter, for example. That is, the adjustment unit 1305a computes adjustment information for adjusting operations of the swarm robot 1300a. The adjustment unit 1305a outputs the adjustment information to the recognition control AI 1302a and the control information generation unit 1304a. In other words, in the case where the detection unit 13a determines that the processing result for the recognition control AI 1302a is anomalous, the adjustment unit 1305a computes adjustment information such as conditions or parameters of the AI processing in the recognition control A I 1302a, and feeds the adjustment information back to the recognition control AI 1302a. This enables the adjustment unit 1305a to adjust conditions, parameters and the like for operations of the recognition control AI 1302a, such that AI processing results by the recognition control AI 1302a are not anomalous.

Also, the adjustment unit 1305a outputs adjustment information for adjusting operations of the robot control unit 1303a to the control information generation unit 1304a. Thereafter, the control information generation unit 1304a generates control information for controlling the robot control unit 1303a, based on the adjustment information and the determination result, and outputs the generated control information to the robot control unit 1303a.

Similarly, the adjustment unit 1305x acquires the determination result for the AI processing result by the recognition control AI 1302x, and outputs adjustment information to the recognition control AI 1302x and the control information generation unit 1304x. This enables the adjustment unit 1305x to adjust conditions, parameters and the like for operations of the recognition control AI 1302x, such that AI processing results by the recognition control AI 1302x are not anomalous. Also, the adjustment unit 1305x outputs adjustment information for adjusting the robot control unit 1303x to the control information generation unit 1304x. Thereafter, the control information generation unit 1304x generates control information for controlling the robot control unit 1303x, based on the adjustment information and the determination result, and outputs the generated control information to the robot control unit 1303x.

In example 7, an anomaly of the recognition control AI 1302 of all the other (x−1) swarm robots can be determined, based on common high-level information estimated by at least one of the x number of swarm robots. Accordingly, in each of the swarm robots, entering a state where anomalies occur independently, that is, a state where executing tasks collaboratively which is the particular objective of the swarm robots 1300 is hampered due to an anomaly of the observation device 1301, differences in observation results or the like, can be avoided.

Also, in example 7, high-level information does not need to be estimated independently in each of the swarm robots 1300, and thus there are cost benefits due to omitting hardware for estimation. Furthermore, operational benefits are obtained such as extending the drive time due to reducing the calculation load.

In example 7, due to L (where L is an integer of 1 or more and less than x) number of swarm robots, for example, having the estimation unit 11 and the high-level information storage unit 102, out of the x number of swarm robots, even if the observation device of any of the L swarm robots malfunctions or an observation result cannot be obtained in the observation device of any of the L swarm robots due to noise or the like, estimation results can be shared for use with the other swarm robots, and a highly redundant or robust system can be built.

Note that the swarm robots of example 7 may be traveling robots or may be flying robots (unmanned aerial vehicles, drones), for example.

[Physical Configuration]

Figure 14:
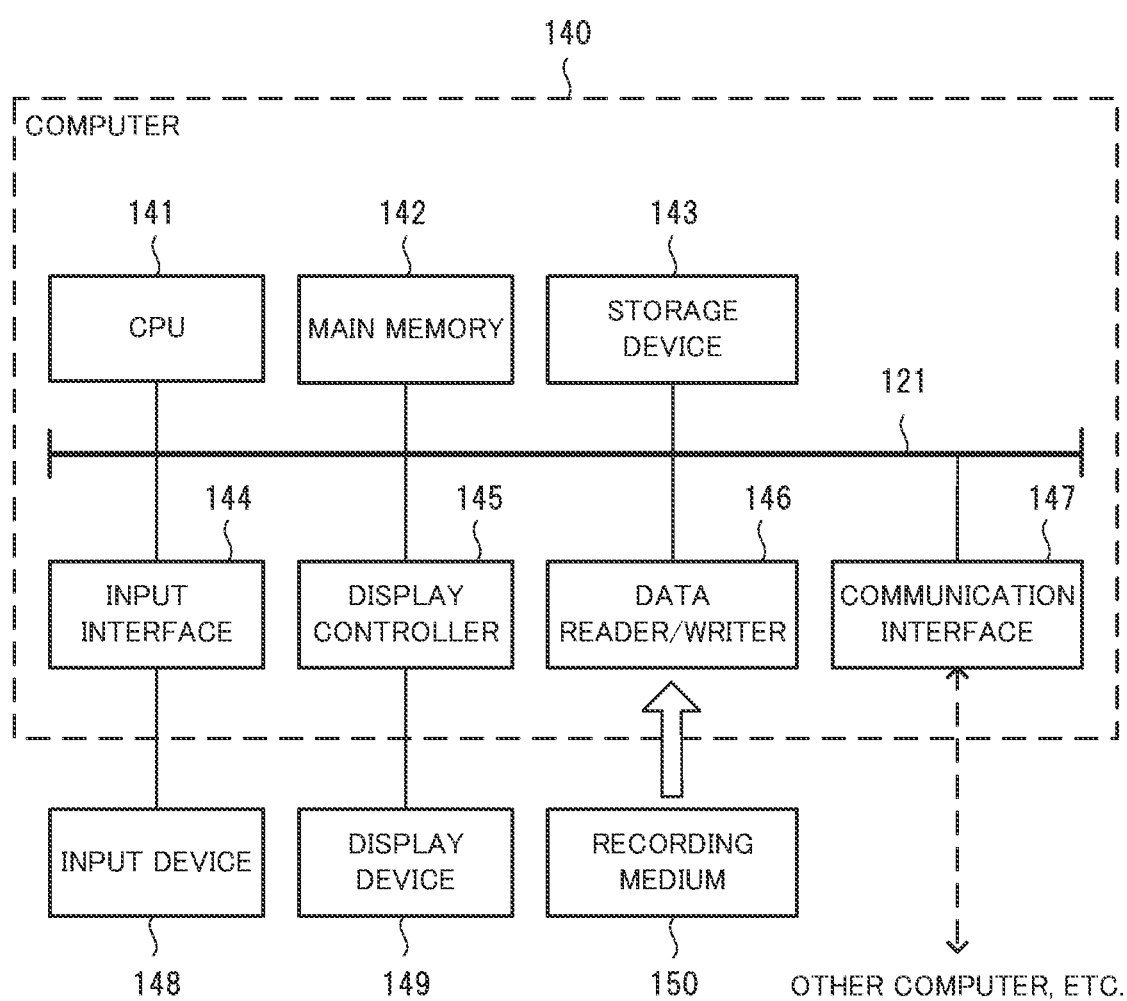
FIG. 14 is a block diagram showing an example of a computer that realizes an anomaly detection apparatus.

Here, a computer for realizing an anomaly detection apparatus by executing programs of the above-described first to fourth example embodiments and examples 1 to 7 will be described using FIG. 14. FIG. 14 is a block diagram showing an example of a computer for realizing the anomaly detection apparatus of each of the above-described first to fourth example embodiments.

As shown in FIG. 14, a computer 140 is provided with a CPU (Central Processing Unit) 141, a main memory 142, a storage device 143, an input interface 144, a display controller 145, a data reader/writer 146, and a communication interface 147. These units are connected to each other in a data communicable manner via a bus 151. Note that the computer 140 may be provided with a GPU (Graphics Processing Unit) or an FPGA (Field-Programmable Gate Array) in addition to the CPU 141 or instead of the CPU 141.

The CPU 141 implements various computational operations, by extracting programs (code) of the example embodiments that are stored in the storage device 143 to the main memory 142, and executing these programs in predetermined order. The main memory 142, typically, is a volatile storage device such as a DRAM (Dynamic Random Access Memory). Also, programs in the example embodiments are provided in a state of being stored in a computer-readable recording medium 150. Note that programs in the example embodiments may also be distributed over the Internet connected via the communication interface 147. The recording medium 150 is a non-transitory recording medium.

Also, a semiconductor storage device such as a flash memory is given as a specific example of the storage device 143, other than a hard disk drive. The input interface 144 mediates data transmission between the CPU 141 and input devices 148 such as a keyboard and a mouse. The display controller 145 is connected to a display device 149 and controls display by the display device 149.

The data reader/writer 146 mediates data transmission between the CPU 141 and the recording medium 150, and executes readout of programs from the recording medium 150 and writing of processing results of the computer 140 to the recording medium 150. The communication interface 147 mediates data transmission between the CPU 141 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 150.

Note that the anomaly detection apparatus of each example embodiment is also realizable by using hardware corresponding to the respective units, rather than by a computer on which programs are installed. Furthermore, the anomaly detection apparatus may be realized in part by programs, and the remaining portion thereof may be realized by hardware.

Note that some or all of the above example embodiments can also be described as in the following supplementary notes. However, the invention illustratively described in the above example embodiments is not limited to the following.

(Supplementary Note 1)

An anomaly detection apparatus including:

an estimation means for estimating first processing result information in accordance with first processing, using data regarding a target;

an evaluation means for comparing second processing result data, for the data, obtained by second processing that differs from the first processing with the first processing result information; and a detection means for detecting an anomaly of the second processing according to a result of the comparison.

(Supplementary Note 2)

The anomaly detection apparatus according to supplementary note 1, whereby the first processing is at least one of processing for classifying the data, processing for performing estimation using the data, processing for extracting a tendency of the data, processing for extracting a relevancy between the data, and processing for predicting a relevancy between the data.

(Supplementary Note 3)

The anomaly detection apparatus according to supplementary note 1 or 2, whereby the second processing is at least one of mathematical processing that uses the data or statistical processing that uses the data.

(Supplementary Note 4)

The anomaly detection apparatus according to any of supplementary notes 1 to 3, whereby the first processing is processing performed in accordance with dynamics regarding the target.

(Supplementary Note 5)

The anomaly detection apparatus according to any of supplementary notes 1 to 4, whereby the first processing result information is smaller in size than the data, and the first processing result information differs from a subset of the data.

(Supplementary Note 6)

The anomaly detection apparatus according to any of supplementary notes 1 to 5, whereby the estimation means estimates the first processing result information, using the data and second data that differs from the data.

(Supplementary Note 7)

The anomaly detection apparatus according to any of supplementary notes 1 to 6, whereby the evaluation means computes a probability of the first processing result information being obtained in a case where the second processing result data is obtained, and the detection means detects an anomaly according to whether the degree satisfies a predetermined criterion for determining the anomaly.

(Supplementary Note 8)

The anomaly detection apparatus according to supplementary note 7, whereby the degree is a likelihood, an information amount or a distance.

(Supplementary Note 9)

A control device comprising:

the anomaly detection apparatus according to any of supplementary notes 1 to 8;

an adjustment means for generating adjustment information for adjusting a condition of the second processing or a parameter of the second processing, using the comparison result; and a control information generation means for generating control information for controlling operations of the target, using the adjustment information.

(Supplementary Note 10)

The control device according to supplementary note 9, whereby the adjustment means generates, in accordance with a relation between the comparison result and a condition of the second processing or a parameter of the second processing, adjustment information indicating the condition or a value of the parameter that depends on the comparison result.

(Supplementary Note 11)

The control device according to supplementary note 10, whereby the adjustment means generates the adjustment information in a case where the anomaly is detected by the anomaly detection apparatus.

(Supplementary Note 12)

The control device according to supplementary note 11, whereby the target is a plurality of targets, the estimation means is provided for the plurality of targets, and the evaluation means is provided for every one of the targets, and all of the evaluation means use the first processing result information estimated by the estimation means.

(Supplementary Note 13)

An anomaly detection method that cause an information processing device to carry out:

estimating first processing result information in accordance with first processing, using data regarding a target;

comparing second processing result data, for the data, obtained by second processing that differs from the first processing with the first processing result information; and detecting an anomaly of the second processing according to a result of the comparison.

(Supplementary Note 14)

A computer-readable recording medium that includes a program recorded thereon, the program including instructions that cause a computer to carry out:

an estimation function of estimating first processing result information in accordance with first processing, using data regarding a target;

an evaluation function of comparing second processing result data, for the data, obtained by second processing that differs from the first processing with the first processing result information; and a detection function of detecting an anomaly of the second processing according to a result of the comparison.

Although the instant invention has been described above with reference to example embodiments, the invention is not limited to the foregoing example embodiments. Various modifications that will be apparent to those skilled in the art can be made to the configurations and details of the instant invention within the scope of the invention.

INDUSTRIAL APPLICABILITY

According to the invention as described above, anomalies of AI processing results can be detected. The invention is useful in fields where complex processing (e.g., processing that affects social infrastructure, etc.) that requires human judgment needs to be replaced with an AI. For example, the invention is useful in fields where a high level of processing accuracy is demanded of AIs, such as where appropriate processing results that satisfy certain conditions or processing results intended by humans are demanded of AI processing results.

LIST OF REFERENCE SIGNS 10, 50, 80, 90, 110, 120, 130a, 130x Anomaly detection apparatus
11, 501, 1201 Estimation unit
12, 901, 12a, 12b, 12x Evaluation unit
13, 902, 13a, 13b, 13x Detection unit
14 Output information generation unit
100, 100a, 100b, 100x Input data storage unit
101, 900, 101a, 101b, 101x AI engine
102, 1200 High-level information storage unit
103 Output Device
400, 1301a, 1301x Image capturing apparatus
401 Image Recognition AI
500 Information Storage Unit
502, 803, 903, 1103, 1104, 1305a, 1305x Adjustment unit
800a, 1100a Observation device
800b, 1100b, 1303a, 1303x Robot control unit
801, 1101 Environment recognition AI
802, 1105, 1304a; 1304x Control information generation unit
1102 Autonomous control AI
1300a, 1300x Swarm robot
1302a; 1302x Recognition control AI
140 Computer
141 CPU
142 Main memory
143 Storage device
144 Input interface
145 Display controller
146 Data reader/writer
147 Communication interface
148 Input device
149 Display device
150 Recording medium
151 Bus

What is claimed is:

1. An apparatus comprising:
at least one memory storing instructions; and
at least one processor configured to execute the instructions to:

estimate high-level information of an upper layer of a DIKW (Data, Information, Knowledge and Wisdom) model from data of a lowest layer of the DIKW model, using first input data, wherein
the first input data comprises observation data acquired from a camera or a lidar mounted on a robot;
the DIKW model comprises a D (Data) layer as the lowest layer, an I (Information) layer above the D layer, a K (Knowledge) layer above the I layer, and a W (Wisdom) layer that is a highest layer and is above the K layer,
the upper layer is the I, K, or W layer,
the estimated high-level information corresponds to a user assessment of the first input data;
input the first input data an artificial intelligence (AI) engine that executes predetermined processing;
receive, as a processing result of the predetermined processing, output from the AI engine, the processing result corresponding to an AI assessment of the first input data;
evaluate the processing result by comparing the processing result to the estimated high-level information;
determine whether or not the processing result is abnormal according to an evaluation result, wherein the processing result is abnormal when the processing result differs from the estimated high-level information;
adjust either or both of a control plan and a trajectory of the robot when the processing result has been determined as abnormal to reduce a likelihood that a future processing result based on future first input data is abnormal; and
control the robot based on either or both of the control plan and the trajectory of the robot as has been adjusted.

2. The apparatus according to claim 1,
wherein the at least one processor is configured to execute the instructions to further:
estimate the high-level information by further using second input data that is different from the first input data and that is not input to the AI engine.

3. The apparatus according to claim 2,
wherein the at least one processor is configured to execute the instructions to further:
when the processing result is abnormal, output adjustment information used for adjusting the processing result of the AI engine.

4. The apparatus according to claim 3,
wherein when a system has a plurality of AI engines, the evaluation, the determination and the adjustment processing are performed for each AI engine, and
in the determination, the determination result for the processing result of the AI engine of a previous stage is input to the AI engine of a subsequent stage.

5. The apparatus according to claim 3,
wherein when a system has a plurality of AI engines, the evaluation, the determination and the adjustment processing are performed for each AI engine, and
in the evaluation, the high-level information that is common to each AI engine is used.

6. The apparatus according to claim 2,
wherein the high-level information has a dimension lower than a dimension of the first and second input data, and is not a subset of the first and second input data.

7. The apparatus according to claim 1,
wherein the high-level information is information representing a dependency between states of an environment by using at least a logical expression, a graph in graph theory, and a network.

8. The apparatus according to claim 1,
wherein the at least one processor is configured to execute the instructions to further:
compute a degree of conflict between the processing result and the high-level information, and
wherein the processing result is a posterior probability distribution for the first input data, the high-level information is a probability distribution of a feature amount based on a precondition and a regularity, and the degree of conflict is evaluated by using any one of a likelihood, a KL (Kullback-Leibler) information amount, and distance information.

9. A method performed by an information processing device and comprising:
estimating high-level information of an upper layer of a DIKW (Data, Information, Knowledge and Wisdom) model from data of a lowest layer of the DIKW model, using first input data, wherein
the first input data comprises observation data acquired from a camera or a lidar mounted on a robot;
the DIKW model comprises a D (Data) layer as the lowest layer, an I (Information) layer above the D layer, a K (Knowledge) layer above the I layer, and a W (Wisdom) layer that is a highest layer and is above the K layer,
the upper layer is the I, K, or W layer,
the estimated high-level information corresponds to a user assessment of the first input data;
inputting the first input data an artificial intelligence (AI) engine that executes predetermined processing;
receiving, as a processing result of the predetermined processing, output from the AI engine, the processing result corresponding to an AI assessment of the first input data;
evaluating the processing result by comparing the processing result to the estimated high-level information;
determining whether or not the processing result is abnormal according to an evaluation result, wherein the processing result is abnormal when the processing result differs from the estimated high-level information;
adjusting either or both of a control plan and a trajectory of the robot when the processing result has been determined as abnormal to reduce a likelihood that a future processing result based on future first input data is abnormal; and
controlling the robot based on either or both of the control plan and the trajectory of the robot as has been adjusted.

10. A non-transitory computer-readable recording medium storing a program executable by a computer to perform processing comprising:
estimating high-level information of an upper layer of a DIKW (Data, Information, Knowledge and Wisdom) model from data of a lowest layer of the DIKW model, using first input data, wherein
the first input data comprises observation data acquired from a camera or a lidar mounted on a robot;
the DIKW model comprises a D (Data) layer as the lowest layer, an I (Information) layer above the D layer, a K (Knowledge) layer above the I layer, and a W (Wisdom) layer that is a highest layer and is above the K layer,
the upper layer is the I, K, or W layer,
the estimated high-level information corresponds to a user assessment of the first input data;
inputting the first input data an artificial intelligence (AI) engine that executes predetermined processing;
receiving, as a processing result of the predetermined processing, output from the AI engine, the processing result corresponding to an AI assessment of the first input data;
evaluating the processing result by comparing the processing result to the estimated high-level information;
determining whether or not the processing result is abnormal according to an evaluation result, wherein the processing result is abnormal when the processing result differs from the estimated high-level information;
adjusting either or both of a control plan and a trajectory of the robot when the processing result has been determined as abnormal to reduce a likelihood that a future processing result based on future first input data is abnormal; and
controlling the robot based on either or both of the control plan and the trajectory of the robot as has been adjusted.

* * * * *